US007012723B2

(12) United States Patent
Yoshikawa et al.

(10) Patent No.: US 7,012,723 B2
(45) Date of Patent: Mar. 14, 2006

(54) OPTICAL SCANNING DEVICE AND COLOR IMAGE FORMING APPARATUS

(75) Inventors: Masanori Yoshikawa, Neyagawa (JP); Hideo Hirose, Hirakata (JP); Motonobu Yoshikawa, Osaka (JP); Yoshiharu Yamamoto, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/537,420

(22) PCT Filed: Dec. 8, 2003

(86) PCT No.: PCT/JP03/15688

§ 371 (c)(1),
(2), (4) Date: Jun. 2, 2005

(87) PCT Pub. No.: WO2004/063790

PCT Pub. Date: Jul. 29, 2004

(65) Prior Publication Data

US 2006/0017995 A1    Jan. 26, 2006

(30) Foreign Application Priority Data

Jan. 16, 2003    (JP)    ............................. 2003-008790

(51) Int. Cl.
*G02B 26/08*    (2006.01)
(52) U.S. Cl. ........................ 359/204; 359/208; 347/243
(58) Field of Classification Search .................... None
See application file for complete search history.

(56) References Cited

U.S. PATENT DOCUMENTS

| 6,052,211 | A | 4/2000 | Nakajima |
| 6,392,773 | B1 | 5/2002 | Hama et al. |
| 2004/0252178 | A1 * | 12/2004 | Yoshikawa et al. |

FOREIGN PATENT DOCUMENTS

| EP | 1 152 278 | 11/2001 |
| EP | 1 217 415 | 6/2002 |
| JP | 10-148777 | 6/1998 |
| JP | 11-153764 | 6/1999 |
| JP | 2000-141759 | 5/2000 |
| JP | 2001-100130 | 4/2001 |
| JP | 2001-133717 | 5/2001 |

* cited by examiner

*Primary Examiner*—James Phan
(74) *Attorney, Agent, or Firm*—Hamre, Schumann, Mueller & Larson, P.C.

(57) ABSTRACT

By a first image forming optical system (42a to 42d), a plurality of light beams from light sources (41a to 41d) form linear images on a common deflecting surface (46) of an optical deflector (44). Light beams reflected off the optical deflector (44) are reflected by a plurality of curved surface mirrors (45a to 45d) and are allowed to scan over photosensitive members (4a to 4d), respectively. The plurality of curved surface mirrors (45a to 45d) are disposed on the same side with respect to a plane that includes a normal line at a center of the deflecting surface (46) and is parallel to a main scanning direction. Further, curved surfaces of the plurality of curved surface mirrors (45a to 45d) vary in shape. Thus, a tandem type color image forming apparatus that achieves low cost and has excellent optical performance and an optical scanning device that is used favorably in the color image forming apparatus can be provided.

16 Claims, 14 Drawing Sheets

OPTICAL SCANNING DEVICE AND COLOR IMAGE FORMING APPARATUS

TECHNICAL FIELD

The present invention relates to a color image forming apparatus that is typified by a laser beam printer, a laser facsimile, a digital copier and the like and an optical scanning device for use in such color image forming apparatuses.

BACKGROUND ART

As a conventional color image forming apparatus, for example, a so-called tandem type apparatus is known in which a plurality of image forming units are arranged in order with respect to a paper-conveying path along a horizontal direction, and toner images are transferred sequentially from the image forming units onto a paper sheet being conveyed along the paper-conveying path so that a color image is formed on the paper sheet. As an optical scanning device used in the tandem type color image forming apparatus, a device merely using four optical scanners with each scanning a single light beam (see JP2000-141759 A), a device using a single optical deflector and four sets of lens systems (see JP2001-133717 A), or a device using four sets of curved surface mirrors and lenses (see JP10(1998)-148777 A) is known.

However, the optical scanning devices proposed as above have presented the following problems. That is, the optical scanning devices require a large number of components and thus are costly. Further, in the optical scanners, uniform performance of scanning lines hardly can be provided.

DISCLOSURE OF THE INVENTION

In view of the above-mentioned problems, it is an object of the present invention to provide a tandem type color image forming apparatus that achieves low cost and has excellent optical performance and an optical scanning device that is used favorably in the color image forming apparatus.

In order to achieve the above-mentioned object, an optical scanning device according to the present invention includes: a plurality of light sources; a single optical deflector that scans light beams emitted respectively from the plurality of light sources; a first image forming optical system that is disposed between the optical deflector and the plurality of light sources and allows linear images of the light beams to be formed on a common deflecting surface of the optical deflector; and a second image forming optical system that is disposed between the optical deflector and a plurality of surfaces to be scanned corresponding to the plurality of light sources and has a plurality of curved surface mirrors that are in one-to-one correspondence with the plurality of surfaces to be scanned. In the optical scanning device, the plurality of light sources, the optical deflector, and the second image forming optical system are disposed at different positions in a sub-scanning direction so that light beams from the first image forming optical system are incident respectively on the deflecting surface obliquely with respect to a plane that includes a normal line at a center of the deflecting surface of the optical deflector and is parallel to a main scanning direction (hereinafter, referred to as a "main scanning plane"), and so that light beams from the optical deflector are incident respectively on the plurality of curved surface mirrors obliquely with respect to a plane that includes each of normal lines at vertices of the plurality of curved surface mirrors and is parallel to the main scanning direction. Further, in the optical scanning device, the plurality of curved surface mirrors are disposed on the same side with respect to the main scanning plane, and curved surfaces of the plurality of curved surface mirrors vary in shape.

Furthermore, a color image forming apparatus according to the present invention includes: the above-described optical scanning device according to the present invention; a plurality of photosensitive members that are disposed respectively on the plurality of surfaces to be scanned; a plurality of developers that correspond respectively to the plurality of photosensitive members and develop toner images of different colors respectively on the plurality of photosensitive members; a transferring unit that transfers the toner images on the plurality of photosensitive members onto a transfer material; and a fixer that fixes the toner images transferred onto the transfer material.

BEST MODE FOR CARRYING OUT THE INVENTION

Figure 1:
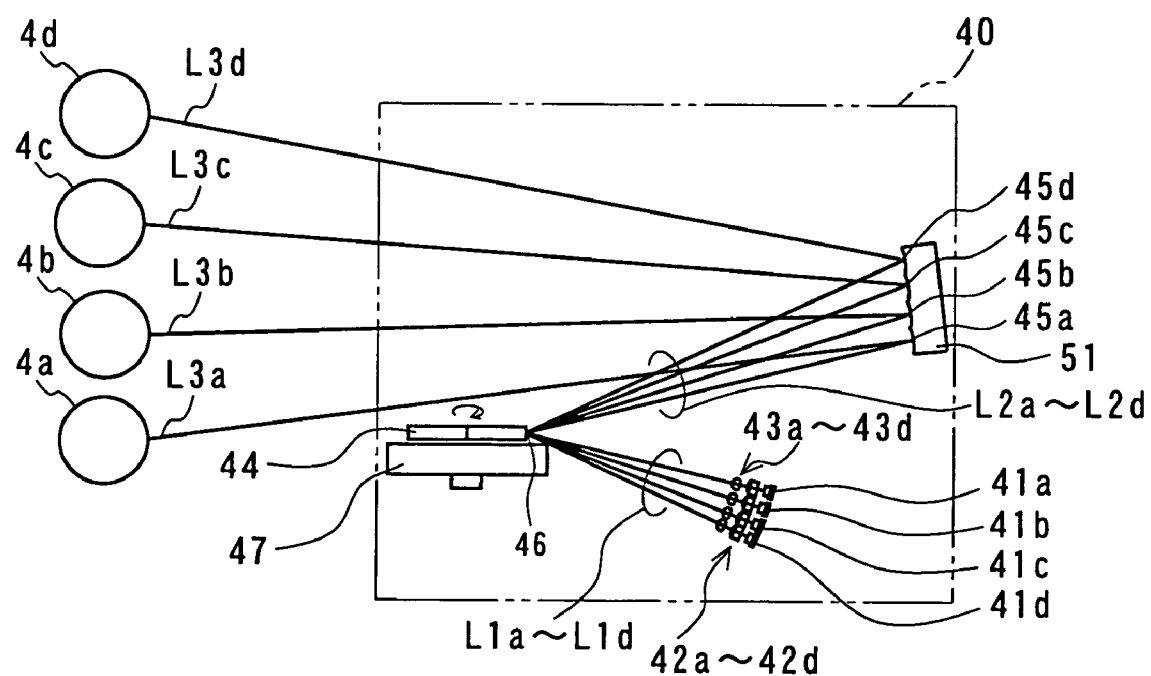
FIG. 1 is a schematic structural view of an optical unit that is an optical scanning device according to Embodiment 1 of the present invention.

As described above, the optical scanning device according to the present invention includes: a plurality of light sources; a single optical deflector that scans light beams emitted respectively from the plurality of light sources; a first image forming optical system that is disposed between the optical deflector and the plurality of light sources and allows linear images of the light beams to be formed on a common deflecting surface of the optical deflector; and a second image forming optical system that is disposed between the optical deflector and a plurality of surfaces to be scanned corresponding to the plurality of light sources and has a plurality of curved surface mirrors that are in one-to-one correspondence with the plurality of surfaces to be scanned. In the optical scanning device, the plurality of light sources, the optical deflector, and the second image forming optical system are disposed at different positions in a sub-scanning direction so that light beams from the first image forming optical system are incident respectively on the deflecting surface obliquely with respect to a plane that includes a normal line at a center of the deflecting surface of the optical deflector and is parallel to a main scanning direction (main scanning plane), and so that light beams from the optical deflector are incident respectively on the plurality of curved surface mirrors obliquely with respect to a plane that includes each of normal lines at vertices of the plurality of curved surface mirrors and is parallel to the main scanning direction. Further, in the optical scanning device, the plurality of curved surface mirrors are disposed on the same side with respect to the main scanning plane. Moreover, in the optical scanning device, curved surfaces of the plurality of curved surface mirrors vary in shape.

Herein, "a normal line at a center of the deflecting surface of the optical deflector" refers to a normal line to a deflecting surface on which light beams are incident when the deflecting surface is rotated so as to be in an orientation such that the normal line is included in an XZ plane (a plane including a rotation axis of the optical deflector and the vertices of the plurality of curved surface mirrors).

According to the above-described optical scanning device of the present invention, an optical scanning device can be realized that, while having optical paths from light sources to photosensitive members that are different from one another, reduces the number of components, has excellent optical performance, and allows a relative difference in performance between scanning lines to be reduced.

Preferably, in the above-described optical scanning device according to the present invention, the plurality of curved surface mirrors have a width in the sub-scanning direction that increases in a direction from one of the plurality of curved surface mirrors close to the optical deflector toward another of the plurality of curved surface mirrors far from the optical deflector.

Furthermore, preferably, in the above-described optical scanning device according to the present invention, in the plane including the rotation axis of the optical deflector and the vertices of the plurality of curved surface mirrors (hereinafter, referred to as the "XZ plane"), no two from among a plurality of light beams that are incident on the optical deflector, a plurality of light beams that are reflected off the optical deflector to be incident on the plurality of curved surface mirrors, and a plurality of light beams that are reflected off the plurality of curved surface mirrors to be directed toward the plurality of surfaces to be scanned are parallel to each other.

Furthermore, preferably, in the above-described optical scanning device according to the present invention, in the plane including the rotation axis of the optical deflector and the vertices of the plurality of curved surface mirrors (XZ plane), a light beam that is incident on the surface to be scanned farthest from the optical deflector among the plurality of surfaces to be scanned forms an angle of not larger than 20 degrees with respect to a light beam that is incident on the surface to be scanned closest to the optical deflector among the plurality of surfaces to be scanned.

Furthermore, preferably, in the above-described optical scanning device according to the present invention, the plurality of curved surface mirrors are configured integrally.

Furthermore, preferably, in the above-described optical scanning device according to the present invention, the plurality of curved surface mirrors vary in position of the vertices in the sub-scanning direction.

Furthermore, preferably, in the above-described optical scanning device according to the present invention, in the sub-scanning direction, the vertices of the plurality of curved surface mirrors are at a distance from a middle portion in the sub-scanning direction of a corresponding one of the plurality of curved surface mirrors, which increases in a direction from one of the plurality of curved surface mirrors close to the optical deflector toward another of the plurality of curved surface mirrors far from the optical deflector.

Furthermore, preferably, in the above-described optical scanning device according to the present invention, the first image forming optical system includes a single cylindrical lens on which a plurality of the light beams are incident.

Furthermore, preferably, the above-described optical scanning device according to the present invention further includes a single aperture that has a plurality of openings for adjusting shapes of light beams emitted from the plurality of light sources, and the aperture is disposed immediately in front of the cylindrical lens.

Furthermore, preferably, in the above-described optical scanning device according to the present invention, no two from among a plurality of light beams emitted from the plurality of light sources are parallel to each other.

Furthermore, preferably, in the above-described optical scanning device according to the present invention, in the plane including the rotation axis of the optical deflector and the vertices of the plurality of curved surface mirrors (XZ plane), where: among the plurality of curved surface mirrors, the curved surface mirror closest to the main scanning plane is a first curved surface mirror, the curved surface mirror farthest from the main scanning plane is an N-th (N is an integer not smaller than 2) curved surface mirror, and the vertex of the first curved surface mirror is at a distance Lm from the vertex of the N-th curved surface mirror; among the plurality of surfaces to be scanned, the surface to be scanned corresponding to the first curved surface mirror is a first surface to be scanned, the surface to be scanned corresponding to the N-th curved surface mirror is an N-th surface to be scanned, and an intersection of the first surface to be scanned and an optical axis of a light beam that is incident on the first surface to be scanned is at a distance Li from an intersection of the N-th surface to be scanned and an optical axis of a light beam that is incident on the N-th surface to be scanned; the vertex of the N-th curved surface mirror is at a distance D1 from the deflecting surface; and the vertex of the N-th curved surface mirror is at a distance D2 from the intersection of the N-th surface to be scanned and the optical axis of the light beam that is incident on the N-th surface to be scanned, a relationship $0.25<(Lm/Li)/(D1/D2)<0.45$ is satisfied.

Furthermore, preferably, in the above-described optical scanning device according to the present invention, in the plane including the rotation axis of the optical deflector and the vertices of the plurality of curved surface mirrors (XZ plane), where: among a plurality of light beams that are directed toward the plurality of surfaces to be scanned, the light beam closest to the optical deflector is a first light beam, the light beam farthest from the optical deflector is an N-th (N is an integer not smaller than 2) light beam, and an optical axis of the first light beam forms an angle $\beta r$ with respect to an optical axis of the N-th light beam; among the plurality of surfaces to be scanned, the surface to be scanned on which the first light beam is incident is a first surface to be scanned, the surface to be scanned on which the N-th light beam is incident is an N-th surface to be scanned, and an intersection of the first surface to be scanned and the optical axis of the first light beam that is incident on the first surface to be scanned is at a distance Li from an intersection of the N-th surface to be scanned and the optical axis of the N-th light beam that is incident on the N-th surface to be scanned; the vertex of an N-th curved surface mirror corresponding to the N-th surface to be scanned is at a distance D1 from the deflecting surface; and the vertex of the N-th curved surface mirror is at a distance D2 from the intersection of the N-th surface to be scanned and the optical axis of the N-th light beam that is incident on the N-th surface to be scanned, a relationship $1.0<(D1+D2)\cdot\tan\beta r/Li<1.6$ is satisfied.

Furthermore, preferably, in the above-described optical scanning device according to the present invention, in the plane including the rotation axis of the optical deflector and the vertices of the plurality of curved surface mirrors (XZ plane), where: among the plurality of curved surface mirrors, the curved surface mirror closest to the main scanning plane is a first curved surface mirror, the curved surface mirror farthest from the main scanning plane is an N-th (N is an integer not smaller than 2) curved surface mirror, among the plurality of surfaces to be scanned, the surface to be scanned corresponding to the first curved surface mirror is a first surface to be scanned, the surface to be scanned corresponding to the N-th curved surface mirror is an N-th surface to be scanned, and a line linking the vertex of the first curved surface mirror with the vertex of the N-th curved surface mirror forms an angle $\Delta\beta$ with respect to a line linking an intersection of the first surface to be scanned and an optical axis of a light beam that is incident on the first surface to be scanned with an intersection of the N-th surface to be scanned and an optical axis of a light beam that is incident on the N-th surface to be scanned; the normal line at the vertex of the N-th curved surface mirror forms an angle $\beta 2$ with respect to an optical axis of an N-th light beam that is incident on the N-th curved surface mirror from the deflecting surface; the vertex of the N-th curved surface mirror is at a distance D1 from the deflecting surface; and the vertex of the N-th curved surface mirror is at a distance D2 from the intersection of the N-th surface to be scanned and the optical axis of the light beam that is incident on the N-th surface to be scanned, a relationship $-1.8<\Delta\beta/\beta 2-0.2\,(D1/D2)<0.4$ is satisfied.

Furthermore, in the above-described optical scanning device according to the present invention, in the plane including the rotation axis of the optical deflector and the vertices of the plurality of curved surface mirrors (XZ plane), it is assumed that, among a plurality of light beams that are directed toward the plurality of surfaces to be scanned, the light beam closest to the optical deflector is a first light beam, the light beam farthest from the optical deflector is an N-th (N is an integer not smaller than 2) light beam, and an optical axis of the first light beam forms an angle $\beta r$ with respect to an optical axis of the N-th light beam. Further, a plane that is orthogonal to the XZ plane and includes each of the normal lines at the vertices of the plurality of curved surface mirrors is assumed to be a YZ plane in each of the plurality of curved surface mirrors. Further, it is assumed that, among the plurality of curved surface mirrors, the curved surface mirror closest to the main scanning plane is a first curved surface mirror, and at the vertex of the first curved surface mirror, the first curved surface mirror has a radius of curvature RxL in a cross section in the XZ plane and a radius of curvature RyL in a cross section in the YZ plane. Further, it is assumed that, among the plurality of curved surface mirrors, the curved surface mirror farthest from the main scanning plane is an N-th curved surface mirror, and at the vertex of the N-th curved surface mirror, the N-th curved surface mirror has a radius of curvature RxH in a cross section in the XZ plane and a radius of curvature RyH in a cross section in the YZ plane. In this case, preferably, a relationship $0.001<[1-RyH\cdot RxL/RxH\cdot RyL]/\tan\beta r<0.012$ is satisfied.

Furthermore, preferably, in the above-described optical scanning device according to the present invention, in the plane including the rotation axis of the optical deflector and the vertices of the plurality of curved surface mirrors (XZ plane), where among the plurality of curved surface mirrors, the curved surface mirror closest to the main scanning plane is a first curved surface mirror, the curved surface mirror farthest from the main scanning plane is an N-th (N is an integer not smaller than 2) curved surface mirror, and a line linking an intersection of a first surface to be scanned corresponding to the first curved surface mirror and an optical axis of a light beam that is incident on the first surface to be scanned with an intersection of an N-th surface to be scanned corresponding to the N-th curved surface mirror and an optical axis of a light beam that is incident on the N-th surface to be scanned forms an angle $\beta id$ (degree) with respect to an optical axis of an N-th light beam that is incident on the N-th surface to be scanned, a relationship $55<\beta id\leq 150$ is satisfied.

Furthermore, the color image forming apparatus according to the present invention includes: the above-described optical scanning device according to the present invention; a plurality of photosensitive members that are disposed respectively on the plurality of surfaces to be scanned; a plurality of developers that correspond respectively to the plurality of photosensitive members and develop toner images of different colors respectively on the plurality of photosensitive members; a transferring unit that transfers the toner images on the plurality of photosensitive members onto a transfer material; and a fixer that fixes the toner images transferred onto the transfer material.

According to the above-described color image forming apparatus of the present invention, a small-sized color image forming apparatus can be realized that allows images of excellent quality to be formed at a low cost.

Hereinafter, the optical scanning device and the color image forming apparatus according to the present invention will be described by way of specific embodiments with reference to FIGS. 1 to 14.

Embodiment 1

FIG. 1 is a schematic structural view of an optical unit 40 that is an optical scanning device in Embodiment 1 of the present invention. In the following description, indices a to d are provided to reference numerals denoting elements so as to correspond to four colors (yellow, magenta, cyan, and black) that are used to form color images, while being omitted in the case where there is no need to make a distinction among the colors.

In FIG. 1, reference characters 42a to 42d denote collimating lenses by which light beams emitted from semiconductor lasers 41a to 41d that are a plurality of light sources are converted respectively into parallel light. Reference characters 43a to 43d denote cylindrical lenses that have a refractive power only in a direction perpendicular to an optical axis in an XZ plane (sub-scanning direction) and linearly focus light beams from the collimating lenses 42a to 42d on a reflecting surface 46 that is a deflecting surface of a polygon mirror 44. Reference character 47 denotes a polygon motor that scans a light beam that is incident on the reflecting surface 46 by rotating the polygon mirror 44 at a predetermined speed. The polygon mirror 44 and the polygon motor 47 constitute an optical deflector. Further, the collimating lenses 42a to 42d and the cylindrical lenses 43a to 43d constitute a first image forming optical system.

Light beams L1a to L1d from the semiconductor lasers 41a to 41d are incident respectively on the reflecting surface 46 from an oblique direction with respect to a plane that includes a normal line to the reflecting surface 46 and is parallel to a main scanning direction (main scanning plane), and are emitted respectively as light beams L2a to L2d according to their respective incident angles. The light beams L2a to L2d are incident respectively on curved surface mirrors 45a to 45d from an oblique direction with respect to a plane that includes each of normal lines at vertices of reflecting surfaces of the curved surface mirrors 45a to 45d and is parallel to the main scanning direction (this plane is defined with respect to each of the curved surface mirrors and is referred to as a "YZ plane" of each of the curved surface mirrors), and are reflected respectively as light beams L3a to L3d to which photosensitive members 4a to 4d, which are a plurality of surfaces to be scanned, are exposed. All of the curved surface mirrors 45a to 45d are disposed on the same side (upper side in the figure) with respect to the plane that includes the normal line to the reflecting surface 46 and is parallel to the main scanning direction (main scanning plane). In the XZ plane, no two from among the light beams L1a to L1d, the light beams L2a to L2d, and the light beams L3a to L3d are parallel to each other. With respect to the shape of each of the curved surface mirrors 45a to 45d, a non-circular arc shape in a cross section in the main scanning direction and a radius of curvature in the sub-scanning direction corresponding to each image height are determined so that curvatures of field in the main and sub-scanning directions and an f-θ error are compensated, and moreover, an amount of a skew of each surface of the curved surface mirrors 45a to 45d at a position corresponding to each image height is determined so that a curvature of a scanning line is compensated. As a result, the curved surface mirrors 45a to 45d vary in shape. These mirrors can be formed of a curved surface mirror such as is described in JP11(1999)-153764 A or JP2001-100130 A, for example.

In the XZ plane, the light beams L3a to L3d have approximately the same length and are emitted respectively from the curved surface mirrors 45a to 45d toward the photosensitive members 4a to 4d in a fan shape so as to separate from one another. The distance between optical axes of light beams toward each pair of adjacent ones of the photosensitive members 4a to 4d is 25 mm. The light beam L3a and the light beam L3d are incident on the photosensitive members 4a and 4d so as to be inclined in a vertical direction at an angle of about 8° with respect to a horizontal direction, respectively. That is, in the XZ plane, the light beam L3d farthest from the polygon mirror 44 forms an angle of 16° with respect to the light beam L3a closest to the polygon mirror 44.

Moreover, the curved surface mirrors 45a to 45d are formed integrally by a method such as resin molding or the like to constitute an integral mirror 51.

Figure 2:
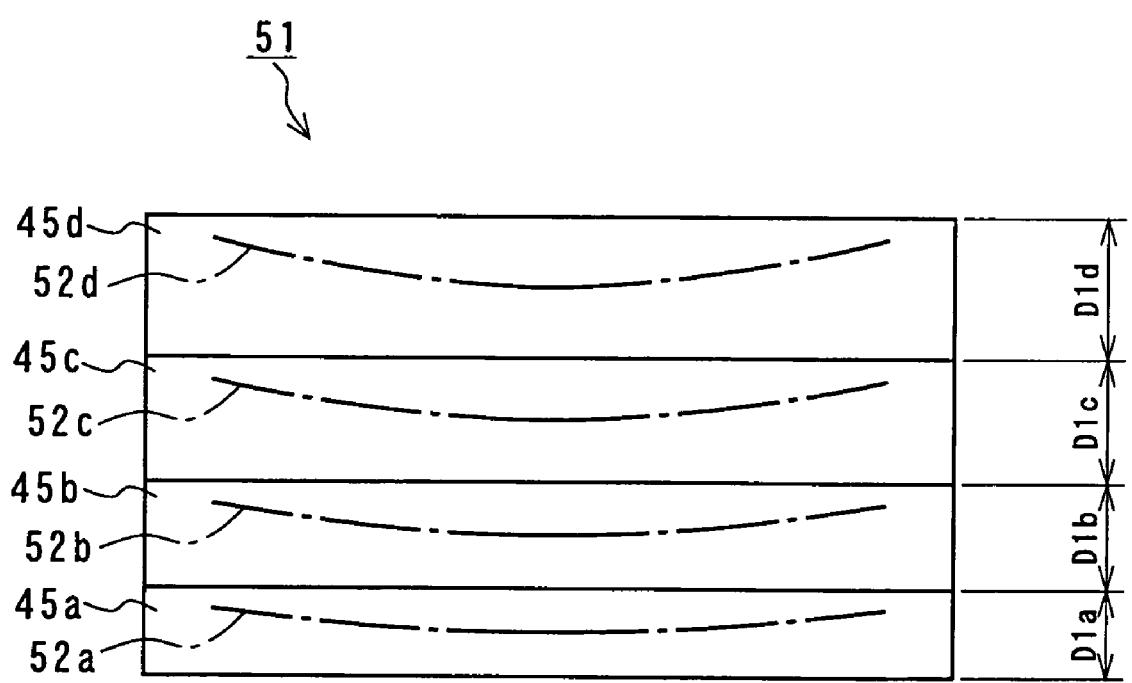
FIG. 2 is a front view of curved surface mirrors used in the optical scanning device according to Embodiment 1 of the present invention.

FIG. 2 is a front view of the curved surface mirrors 45a to 45d. Reference characters 52a to 52d denote trajectories of center positions of the light beams L2a to L2d that are allowed to scan over the curved surface mirrors 45a to 45d, respectively. The light beams L1a to L1d are incident on the reflecting surface 46 from an oblique direction with respect to the plane that includes the normal line to the reflecting surface 46 and is parallel to the main scanning direction (main scanning plane), so that the trajectories 52a to 52d on the curved surface mirrors 45a to 45d form curves as shown in FIG. 2. The curves have a curvature that increases with increasing incident angle in the XZ plane of a corresponding one of the light beams L1a to L1d with respect to the reflecting surface 46, and widths D1a to D1d in the sub-scanning direction of the curved surface mirrors 45a to 45d correspondingly have a relationship D1a<D1b<D1c<D1d.

The following description is directed to the operation of an optical scanning device having the above-described configuration with reference to FIGS. 1 and 2.

Light beams from the semiconductor lasers 41a to 41d are turned into parallel light by the collimating lenses 42a to 42d, respectively. Then, the light beams are converged only in the sub-scanning direction by the cylindrical lenses 43a to 43d, and are focused as linear images on the reflecting surface 46 of the polygon mirror 44, respectively. The polygon mirror 44 is rotated about a rotational optical axis, so that the light beams L1a to L1d are allowed to scan to be incident on the curved surface mirrors 45a to 45d as the light beams L2a to L2d, respectively. Then, the light beams L2a to L2d are reflected by the curved surface mirrors 45a to 45d and form excellent images on the photosensitive members 4a to 4d as the light beams L3a to L3d, respectively. With respect to the shape of each of the curved surface mirrors 45a to 45d, a non-circular arc shape in the cross section in the main scanning direction and a radius of curvature in the sub-scanning direction corresponding to each image height are determined so that curvatures of field in the main and sub-scanning directions and an f-θ error are compensated. Moreover, an amount of a skew of each surface of the curved surface mirrors 45a to 45d at a position corresponding to each image height is determined so that a curvature of a scanning line is compensated. Thus, the relative difference in performance between scanning lines is reduced.

Furthermore, by the curved surface mirrors 45a to 45d, light beams that are allowed to scan over the photosensitive members 4a to 4d are focused on a photodiode that is disposed at an end portion in a scanning direction but is not shown. Using detection signals from the photodiode as synchronizing signals, a controller that is not shown controls the semiconductor lasers 41a to 41d.

The trajectories 52a to 52d of the light beams L2a to L2d that are allowed to scan over the curved surface mirrors 45a to 45d have a degree of curvature that increases with increasing angle in the XZ plane at which a corresponding one of the light beams L2a to L2d is emitted from the reflecting surface 46. However, since the widths D1a to D1d in the sub-scanning direction of the curved surface mirrors 45a to 45d are in the relationship D1a<D1b<D1c<D1d according to the respective degrees of curvature, an effective reflection region is secured sufficiently in each of the curved surface mirrors, and thus excellent images are formed on the photosensitive members 4a to 4d.

As described above, according to Embodiment 1, curved surfaces of the curved surface mirrors 45a to 45d vary in shape. Thus, even in the case of an optical scanning device having optical paths from the light sources 41a to 41d to the photosensitive members 4a to 4d that are different from one another, an optical scanning device can be realized that has excellent optical performance and allows a relative difference in performance between scanning lines to be reduced. Further, it is no longer necessary to provide a bending mirror between the curved surface mirrors 45a to 45d and the photosensitive members 4a to 4d, and thus the number of components can be reduced.

Furthermore, the curved surface mirrors 45a to 45d respectively have the widths D1a to D1d in the sub-scanning direction that are increased gradually in a direction from the curved surface mirror 45a close to the polygon mirror 44 (or the main scanning plane) toward the curved surface mirror 45d far from the polygon mirror 44 (or the main scanning plane). Therefore, an effective reflection region is secured sufficiently in each of the curved surface mirrors, and thus an optical scanning device can be realized that allows excellent images to be formed on the photosensitive members 4a to 4d.

Moreover, in the XZ plane, no two from among the light beams L1a to L1d that are incident on the reflecting surface 46 of the polygon mirror 44, respectively, the light beams L2a to L2d that are reflected off the reflecting surface 46 to be incident on the curved surface mirrors 45a to 45d, respectively, and the light beams L3a to L3d that are reflected off the curved surface mirrors 45a to 45d to be directed toward the photosensitive members 4a to 4d, respectively, are parallel to each other. Thus, the optical elements and the photosensitive members 4a to 4d can be located with an increased degree of freedom, thereby allowing more appropriate characteristics to be obtained.

Moreover, in Embodiment 1, in the XZ plane, the light beam L3d that is directed toward the photosensitive member 4d farthest from the polygon mirror 44 forms an angle (namely, an angle αr that will be described later (see FIGS. 7 and 9)) of not larger than 20 degrees with respect to the light beam L3a that is directed toward the photosensitive member 4a closest to the polygon mirror 44. In the case of using cylindrical photosensitive members, each of the photosensitive members has a decentering component and thus is rotated while wobbling around a rotation axis. In order to suppress an influence of stray light originating in light reflected off surfaces of the photosensitive members, generally, light beams are allowed to be incident on the surfaces of the photosensitive members at an oblique incident angle with respect to a normal direction at a position of incidence. Because of this, when the photosensitive members are being rotated while wobbling, the positions of incidence of the light beams vary, resulting in the occurrence of color shifts in a paper-conveying direction. With the above-described configuration, however, the amount of such color shifts can be suppressed to a practically permissible level.

In addition, the curved surface mirrors 45a to 45d are configured as the integral mirror 51. Therefore, the number of components can be reduced, and in the case of producing curved surface mirrors by resin molding or the like, variations in characteristics of the curved surface mirrors can be suppressed, and thus excellent images free from color shifts and color unevenness can be obtained.

Embodiment 2

Figure 3:
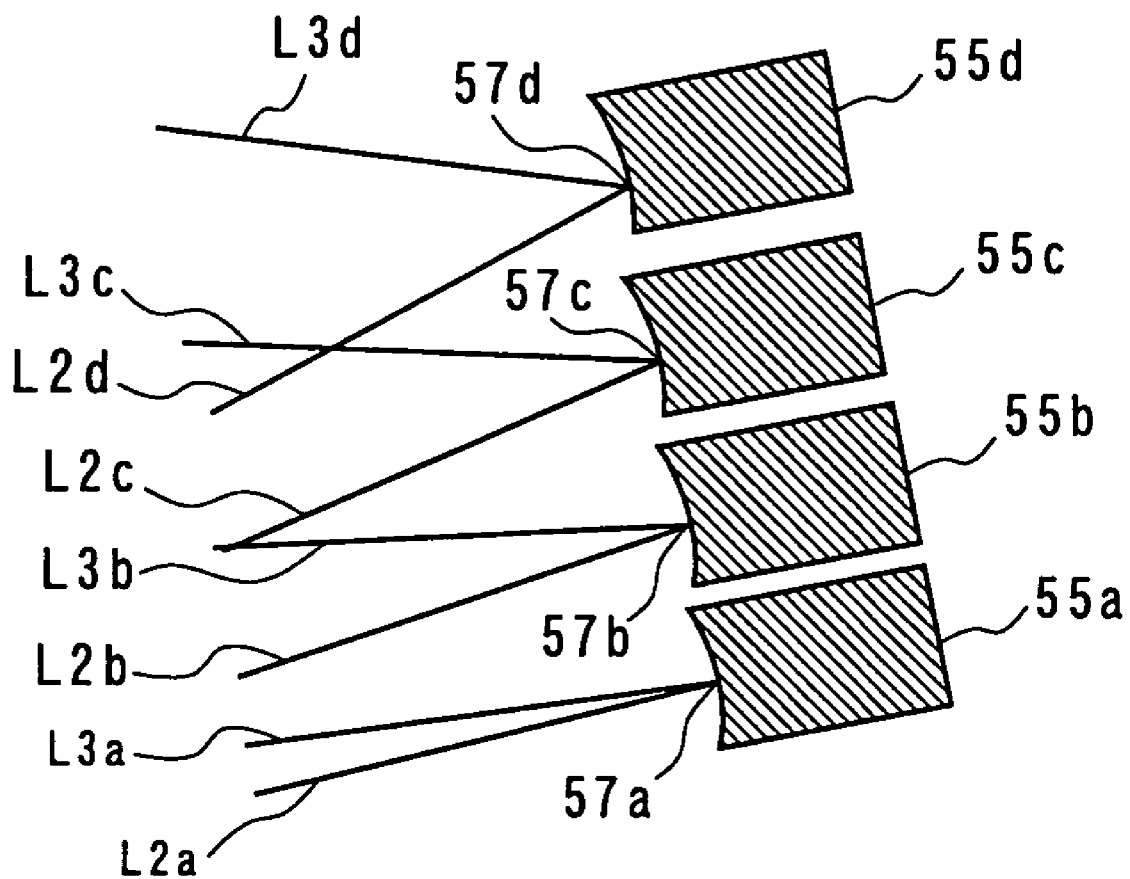
FIG. 3 is a cross-sectional view taken on an XZ plane for showing curved surface mirrors used in an optical scanning device according to Embodiment 2 of the present invention.
Figure 4:
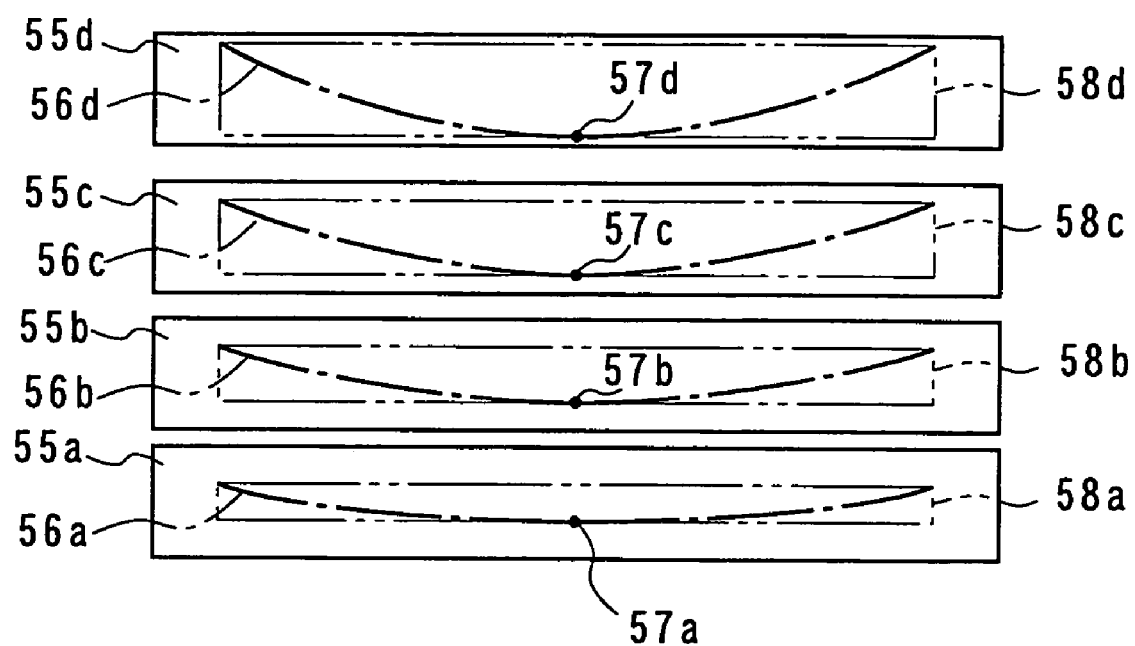
FIG. 4 is a front view of the curved surface mirrors used in the optical scanning device according to Embodiment 2 of the present invention.

FIG. 3 is a cross-sectional view taken on an XZ plane for showing curved surface mirrors 55a to 55d in Embodiment 2, and FIG. 4 is a front view of the curved surface mirrors 55a to 55d. The following description is directed to differences from Embodiment 1. Configurations that are not described specifically are the same as in Embodiment 1.

In FIGS. 3 and 4, the curved surface mirrors 55a to 55d are configured independently so as to be equal in width in a sub-scanning direction. Reference characters 56a to 56d denote trajectories of center positions of light beams L2a to L2d that are allowed to scan over the curved surface mirrors 55a to 55d, respectively. Light beams L1a to L1d are incident on a reflecting surface 46 from an oblique direction with respect to a plane that includes a normal line to the reflecting surface 46 and is parallel to a main scanning direction (main scanning plane), so that the trajectories 56a to 56d on the curved surface mirrors 55a to 55d form curves as shown in FIG. 4. The curves have a curvature that increases with increasing incident angle in the XZ plane of a corresponding one of the light beams L1a to L1d with respect to the reflecting surface 46. Therefore, the trajectories 56a to 56d have a curvature that increases gradually in a direction from the trajectory 56a toward the trajectory 56d. Reference characters 57a to 57d denote vertices of the curved surface mirrors 55a to 55d, respectively. The trajectories 56a to 56d are the curves passing through the vertices 57a to 57d, respectively.

Herein, rectangles 58a to 58d that respectively include the trajectories 56a to 56d are defined. That is, the rectangles 58a to 58d are defined that have one long side whose both ends coincide with both ends of a corresponding one of the trajectories 56a to 56d, and the other long side whose midpoint coincides with a corresponding one of midpoints of the trajectories 56a to 56d (namely, the vertices 57a to 57d). In this embodiment, the rectangles 58a to 58d are provided so as to be at substantially a middle in the main scanning direction and in the sub-scanning direction of a corresponding one of the curved surface mirrors 55a to 55d. That is, the curved surface mirrors 55a to 55d vary in position of the vertices 57a to 57d in the sub-scanning direction among the curved surface mirrors 55a to 55d, and in the sub-scanning direction, the vertices 57a to 57d are at a distance from a middle in the sub-scanning direction of a corresponding one of the curved surface mirrors 55a to 55d, which gradually increases in a direction from the curved surface mirror 55a close to a polygon mirror 44 (or the main scanning plane) toward the curved surface mirror 55d far from the polygon mirror 44 (or the main scanning plane).

The following is a description of the operation of an optical scanning device having the above-described configuration, in which only differences from Embodiment 1 are described with reference to FIGS. 3 and 4.

The trajectories 56a to 56d of the light beams L2a to L2d that are allowed to scan over the curved surface mirrors 55a to 55d have a degree of curvature that increases with increasing angle in the XZ plane at which a corresponding one of the light beams L2a to L2d is emitted from the reflecting surface 46. However, unlike in Embodiment 1, when the rectangles 58a to 58d respectively including the trajectories 56a to 56d are defined, the rectangles 58a to 58d are provided so as to be at substantially a middle in the main scanning direction and in the sub-scanning direction of a corresponding one of the curved surface mirrors 55a to 55d. That is, in the sub-scanning direction, the vertices 57a to 57d of the curved surface mirrors 55a to 55d are at a distance from a middle in the sub-scanning direction of a corresponding one of the curved surface mirrors 55a to 55d, which increases in the direction from the curved surface mirror 55a close to the polygon mirror 44 toward the curved surface mirror 55d far from the polygon mirror 44. Therefore, even in the configuration in which the curved surface mirrors 55a to 55d are equal in size in the main scanning direction and in the sub-scanning direction, an effective reflection region can be secured sufficiently in each of the curved surface mirrors, and thus excellent images can be formed on photosensitive members 4a to 4d.

As described above, according to Embodiment 2, the curved surface mirrors 55a to 55d vary in position of the vertices 57a to 57d in the sub-scanning direction. Moreover, in the sub-scanning direction, the vertices are at a distance from a middle in the sub-scanning direction of a corresponding one of the curved surface mirrors 55a to 55d, which increases in the direction from the curved surface mirror 55a close to the polygon mirror 44 (or the main scanning plane) toward the curved surface mirror 55d far from the polygon mirror 44 (or the main scanning plane). Therefore, even in the configuration in which the curved surface mirrors 55a to 55d are equal in size in the main scanning direction and in the sub-scanning direction, an effective reflection region can be secured sufficiently in each of the curved surface mirrors, and thus excellent images can be formed on the photosensitive members 4a to 4d. Thus, in the case of producing the curved surface mirrors 55a to 55d by resin molding, molds of the same size can be used, making it easier to adjust molding conditions, thereby allowing variations between the curved surface mirrors 55a to 55d to be reduced.

Embodiment 3

Figure 5:
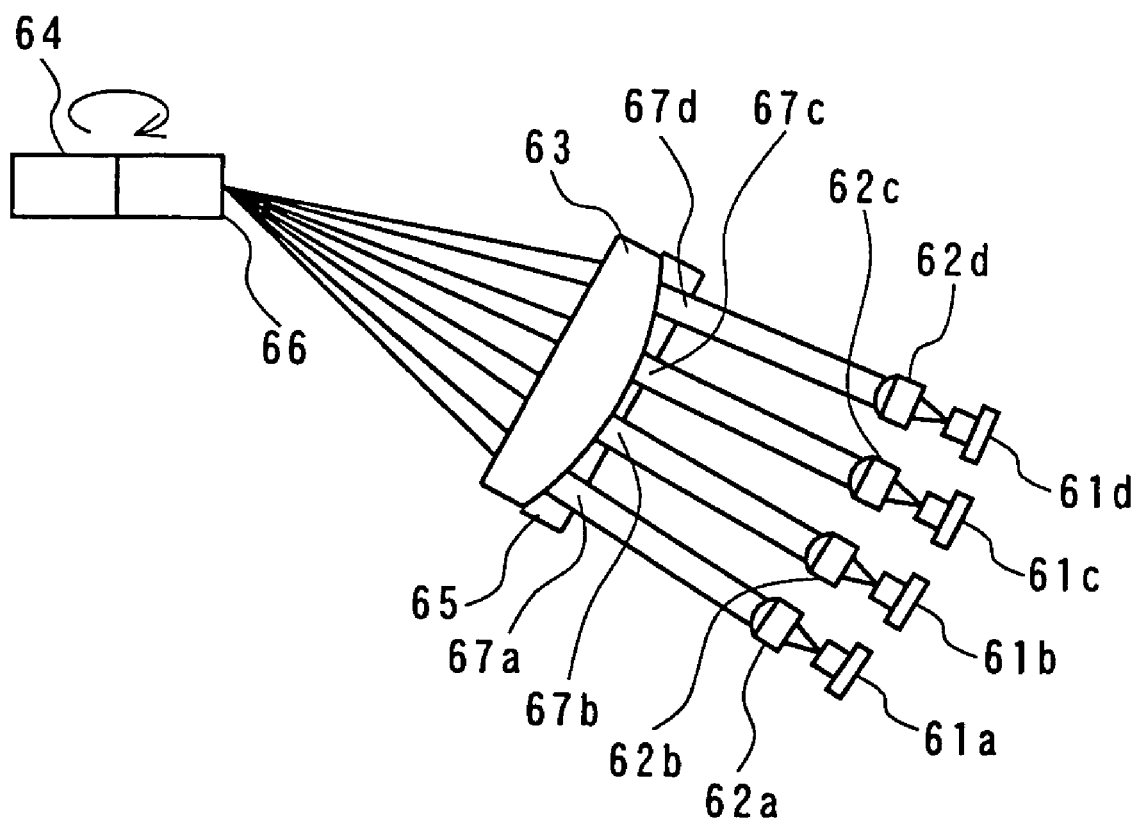
FIG. 5 is a schematic structural view of a first image forming optical system according to Embodiment 3 of the present invention.

FIG. 5 is a schematic structural view showing a preferred embodiment of a first image forming optical system that can be used in Embodiment 1 or Embodiment 2 described above. In FIG. 5, reference characters 62a to 62d denote collimating lenses by which light beams emitted from semiconductor lasers 61a to 61d as a plurality of light sources are converted respectively into parallel light. Reference character 63 denotes a single cylindrical lens that has a refractive power only in a direction perpendicular to an optical axis in an XZ plane (sub-scanning direction) and linearly focuses light beams from the collimating lenses 62a to 62d on a reflecting surface 66 that is a deflecting surface of a polygon mirror 64. Light beams emitted from the semiconductor lasers 61a to 61d are not parallel to one another but have an angle such that the light beams are directed inwardly. Reference character 65 denotes an aperture that is formed of one metal plate in which openings 67a to 67d for adjusting light beams from the collimating lenses 62a to 62d into a predetermined shape are provided by etching, pressing or the like. The aperture 65 is disposed immediately in front of the cylindrical lens 63.

By the use of the above-described first image forming optical system, while the number of components can be reduced, light beams having uniform characteristics can be obtained.

Furthermore, the single cylindrical lens 63 is used to form the first image forming optical system. This can prevent the occurrence of a relative positional error due to changes over time, and thus stable characteristics are obtained.

Moreover, the single aperture 65 in which the openings 67a to 67d are formed is disposed immediately in front of the cylindrical lens 63. Thus, compared with the case of using an individual aperture for each of the light beams, the number of components can be reduced, and moreover, variations in characteristics due to an error in mounting and an influence of changes over time are reduced.

In addition, no two from among light beams from the semiconductor lasers 61a to 61d are parallel to each other. This can provide an increased spacing between each pair of adjacent ones of the semiconductor lasers 61a to 61d, and thus the configuration of a light source block can be simplified.

Embodiment 4

Figure 6:
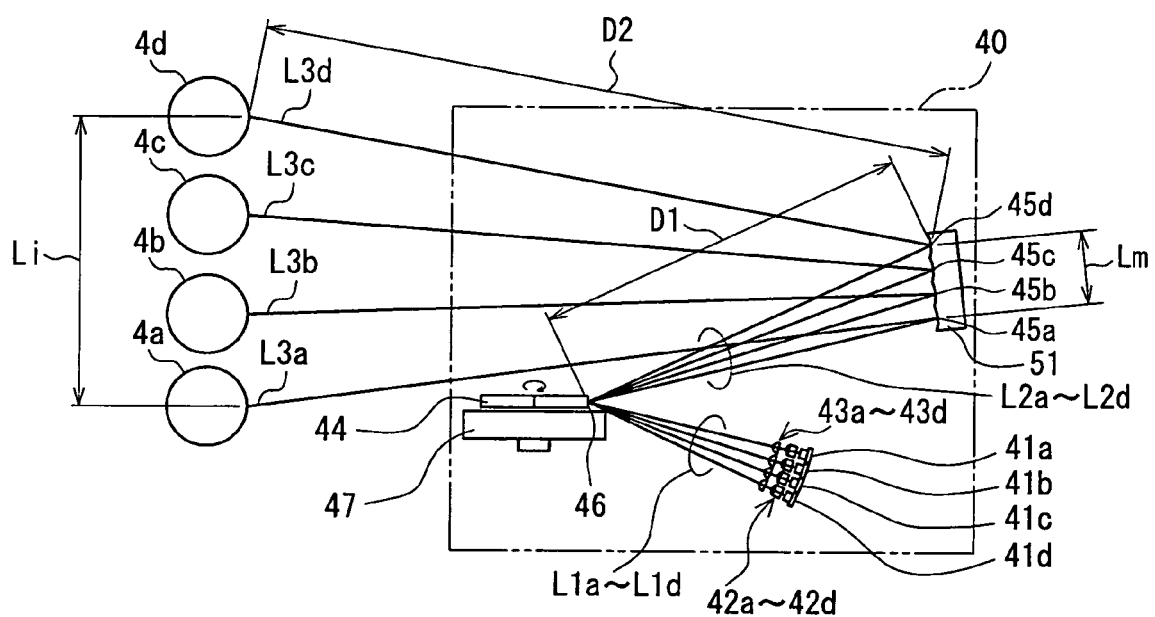
FIG. 6 is a schematic structural view of an optical unit that is an optical scanning device according to Embodiment 4 of the present invention.

FIG. 6 is a schematic structural view of an optical unit that is an optical scanning device in Embodiment 4 of the present invention as seen from a normal direction to an XZ plane. Like reference characters indicate like constituent elements with respect to Embodiment 1, for which detailed descriptions are omitted.

In this embodiment, as shown in FIG. 6, in a plane including a rotation axis of a polygon mirror (optical deflector) 44 and vertices of a plurality of curved surface mirrors 45a to 45d (XZ plane), where: among the plurality of curved surface mirrors 45a to 45d, the curved surface mirror closest to a plane that includes a normal line at a center of a reflecting surface (deflecting surface) 46 and is parallel to a main scanning direction (main scanning plane) is a first curved surface mirror 45a, the curved surface mirror farthest from the main scanning plane is an N-th (in this embodiment, N=4) curved surface mirror 45d, and the vertex of the first curved surface mirror 45a is at a distance Lm from the vertex of the N-th curved surface mirror 45d; among a plurality of photosensitive members (surfaces to be scanned) 4a to 4d, the photosensitive member corresponding to the first curved surface mirror 45a is a first photosensitive member 4a, the photosensitive member corresponding to the N-th curved surface mirror 45d is an N-th photosensitive member 4d, and an intersection of a surface of the first photosensitive member 4a and an optical axis of a light beam L3a that is incident on the surface of the first photosensitive member 4a is at a distance Li from an intersection of a surface of the N-th photosensitive member 4d and an optical axis of a light beam L3d that is incident on the surface of the N-th photosensitive member 4d; the vertex of the N-th curved surface mirror 45d is at a distance D1 from the reflecting surface (deflecting surface) 46; and the vertex of the N-th curved surface mirror 45d is at a distance D2 from the intersection of the surface of the N-th photosensitive member 4d and the optical axis of the light beam L3d that is incident on the surface of the N-th photosensitive member 4d, a relationship $0.25 < (Lm/Li)/(D1/D2) < 0.45$ is satisfied.

When a value of $(Lm/Li)/(D1/D2)$ is lower than a lower limit value of the above inequality, the spacing between each pair of adjacent ones of the plurality of curved surface mirrors 45a to 45d is small, and thus effective regions off which a plurality of light beams are reflected are superimposed on one another, making it difficult to separate the light beams. Further, when the value of $(Lm/Li)/(D1/D2)$ is higher than an upper limit value of the above inequality, a curvature of field in the main scanning direction of not less than 2.5 mm is generated. Further, a light beam having an intensity of $1/e^2$ hardly can be reduced in diameter to not more than 80 μm and further to not more than 60 μm, hindering the realization of a resolution of not less than 400 D.P.I.

By referring to FIG. 6, the foregoing description was made using the optical systems described in Embodiment 1 as an example. However, preferably, the optical systems of Embodiments 2 and 3 also satisfy the above-mentioned relationship to provide the same effects as described above.

Embodiment 5

Figure 7:
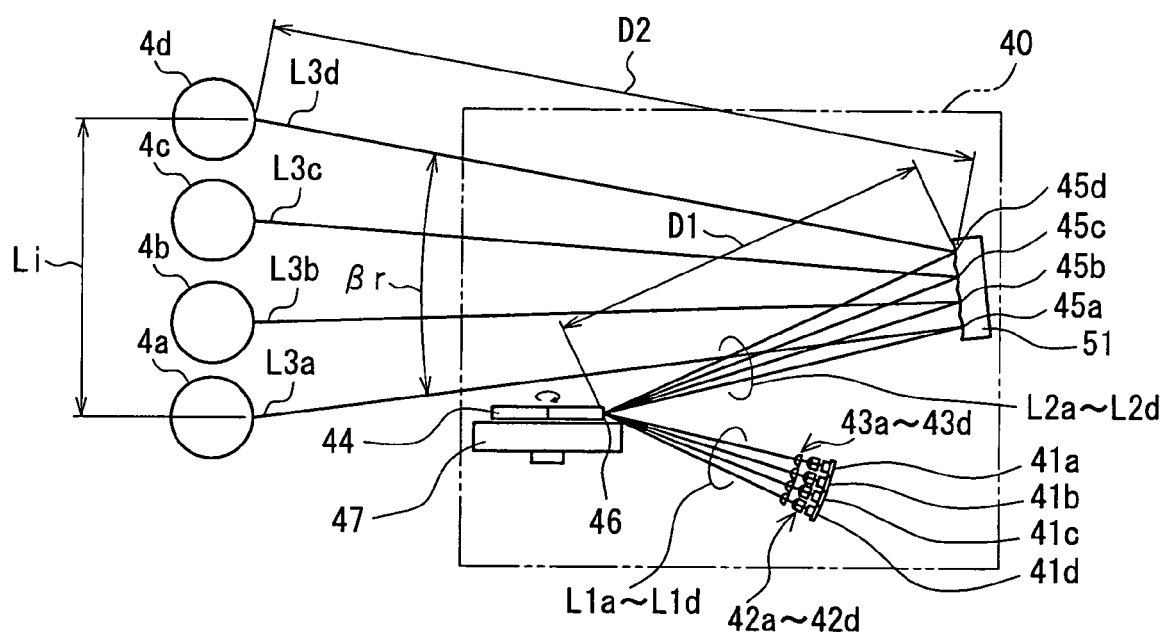
FIG. 7 is a schematic structural view of an optical unit that is an optical scanning device according to Embodiment 5 of the present invention.

FIG. 7 is a schematic structural view of an optical unit that is an optical scanning device in Embodiment 5 of the present invention as seen from a normal direction to an XZ plane. Like reference characters indicate like constituent elements with respect to Embodiment 1, for which detailed descriptions are omitted.

In this embodiment, as shown in FIG. 7, in a plane including a rotation axis of a polygon mirror (optical deflector) 44 and vertices of a plurality of curved surface mirrors 45a to 45d (XZ plane), where: among a plurality of light beams L3a to L3d that are directed toward a plurality of photosensitive members (surfaces to be scanned) 4a to 4d, the light beam closest to the polygon mirror 44 is a first light beam L3a, the light beam farthest from the polygon mirror 44 is an N-th (in this embodiment, N=4) light beam L3d, and an optical axis of the first light beam L3a forms an angle βr with respect to an optical axis of the N-th light beam L3d; among surfaces of the plurality of photosensitive members 4a to 4d, the surface on which the first light beam L3a is incident is the surface of a first photosensitive member 4a, the surface on which the N-th light beam L3d is incident is the surface of an N-th photosensitive member 4d, and an intersection of the surface of the first photosensitive member 4a and the optical axis of the first light beam L3a that is incident on the surface of the first photosensitive member 4a is at a distance Li from an intersection of the surface of the N-th photosensitive member 4d and the optical axis of the N-th light beam L3d that is incident on the surface of the N-th photosensitive member 4d; the vertex of an N-th curved surface mirror 45d corresponding to the N-th photosensitive member 4d is at a distance D1 from a reflecting surface (deflecting surface) 46; and the vertex of the N-th curved surface mirror 45d is at a distance D2 from the intersection of the surface of the N-th photosensitive member 4d and the optical axis of the N-th light beam L3d that is incident on the surface of the N-th photosensitive member 4d, a relationship $1.0 < (D1+D2) \cdot \tan\beta r / Li < 1.6$ is satisfied.

When a value of $(D1+D2) \cdot \tan\beta r / Li$ is lower than a lower limit value of the above inequality, a curvature of field in a main scanning direction of not less than 2.5 mm is generated. Further, a light beam having an intensity of $1/e^2$ hardly can be reduced in diameter to not more than 80 μm and further to not more than 60 μm, hindering the realization of a resolution of not less than 400 D.P.I. Further, when the value of $(D1+D2) \cdot \tan\beta r / Li$ is higher than an upper limit value of the above inequality, the spacing between each pair of adjacent ones of the plurality of curved surface mirrors 45a to 45d is small, and thus effective regions off which a plurality of light beams are reflected are superimposed on one another, making it difficult to separate the light beams.

More preferably, $1.2 < (D1+D2) \cdot \tan\beta r / Li < 1.6$ is satisfied. When the value of $(D1+D2) \cdot \tan\beta r / Li$ is lower than a lower limit value of the above inequality, a curvature of field in the main scanning direction of not less than 1.0 mm is generated. Further, a light beam having an intensity of $1/e^2$ hardly can be reduced in diameter to not more than 60 μm and further to not more than 40 μm, hindering the realization of a resolution of not less than 600 D.P.I.

By referring to FIG. 7, the foregoing description was made using the optical systems described in Embodiment 1 as an example. However, preferably, the optical systems of Embodiments 2 and 3 also satisfy the above-mentioned relationships to provide the same effects as described above.

Embodiment 6

Figure 8:
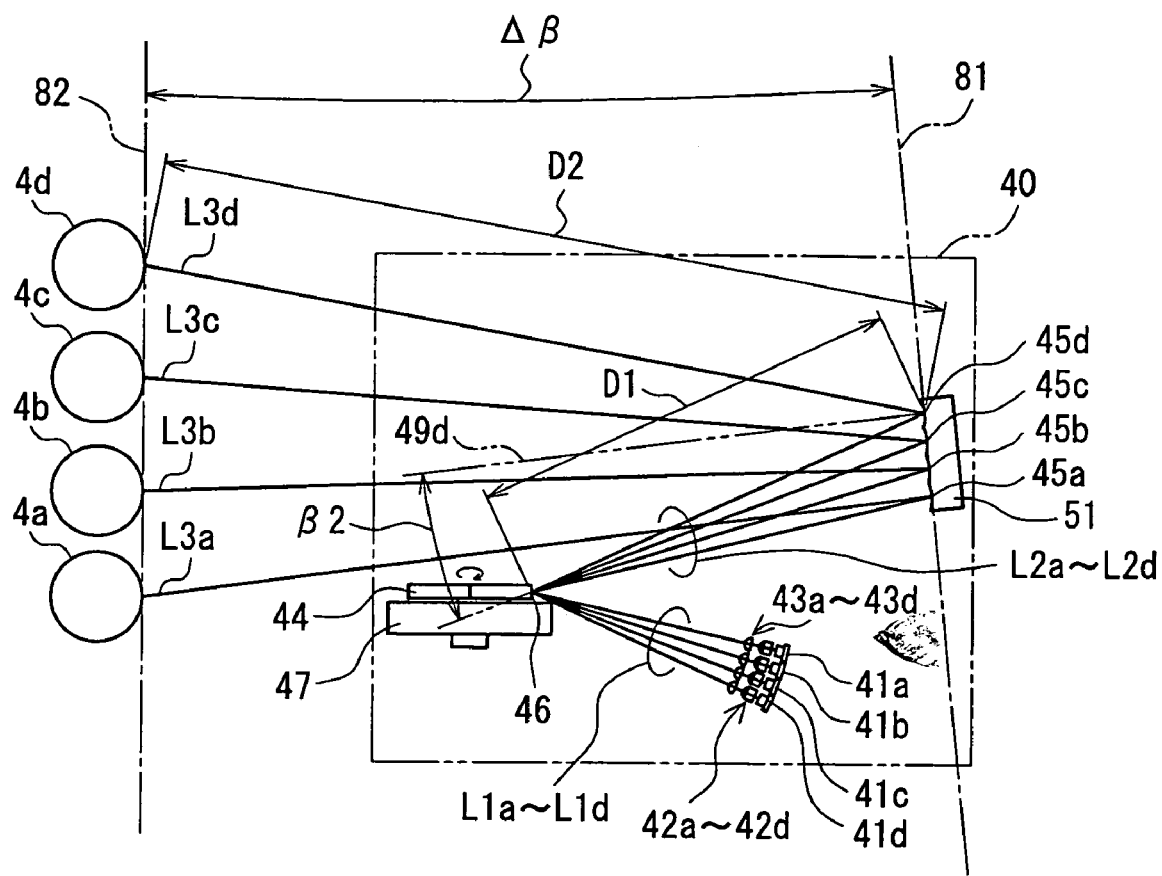
FIG. 8 is a schematic structural view of an optical unit that is an optical scanning device according to Embodiment 6 of the present invention.

FIG. 8 is a schematic structural view of an optical unit that is an optical scanning device in Embodiment 6 of the present invention as seen from a normal direction to an XZ plane. Like reference characters indicate like constituent elements with respect to Embodiment 1, for which detailed descriptions are omitted.

In this embodiment, as shown in FIG. 8, in a plane including a rotation axis of a polygon mirror (optical deflector) 44 and vertices of a plurality of curved surface mirrors 45a to 45d (XZ plane), where: among the plurality of curved surface mirrors 45a to 45d, the curved surface mirror closest to a plane that includes a normal line at a center of a reflecting surface (deflecting surface) 46 and is parallel to a main scanning direction (main scanning plane) is a first curved surface mirror 45a, the curved surface mirror farthest from the main scanning plane is an N-th (in this embodiment, N=4) curved surface mirror 45d, among a plurality of photosensitive members (surfaces to be scanned) 4a to 4d, the photosensitive member corresponding to the first curved surface mirror 45a is a first photosensitive member 4a, the photosensitive member corresponding to the N-th curved surface mirror 45d is an N-th photosensitive member 4d, and a line 81 linking the vertex of the first curved surface mirror 45a with the vertex of the N-th curved surface mirror 45d forms an angle AB with respect to a line 82 linking an intersection of a surface of the first photosensitive member 4a and an optical axis of a light beam L3a that is incident on the surface of the first photosensitive member 4a with an intersection of a surface of the N-th photosensitive member 4d and an optical axis of a light beam L3d that is incident on the surface of N-th photosensitive member 4d; a normal line 49d at the vertex of the N-th curved surface mirror 45d forms an angle β2 with respect to an optical axis of an N-th light beam L2d that is incident on the N-th curved surface mirror 45d from the reflecting surface (deflecting surface) 46; the vertex of the N-th curved surface mirror 45d is at a distance D1 from the reflecting surface (deflecting surface) 46; and the vertex of the N-th curved surface mirror 45d is at a distance D2 from the intersection of the surface of the N-th photosensitive member 4d and the optical axis of the light beam L3d that is incident on the surface of the N-th photosensitive member 4d, a relationship $-1.8 < \Delta\beta/\beta 2 - 0.2 (D1/D2) < 0.4$ is satisfied.

When a value of $\Delta\beta/\beta 2 - 0.2 (D1/D2)$ is lower than a lower limit value of the above inequality or higher than an upper limit value of the above inequality, a curvature of field in the main scanning direction of not less than 2.5 mm is generated. Further, a light beam having an intensity of $1/e^2$ hardly can be reduced in diameter to not more than 80 μm and further to not more than 60 μm, hindering the realization of a resolution of not less than 400 D.P.I.

More preferably, a relationship $-1.4 < \Delta\beta/\beta 2 - 0.2 (D1/D2) < 0$ is satisfied. When the value of $\Delta\beta/\beta 2 - 0.2 (D1/D2)$ is lower than a lower limit value of the above inequality or higher than an upper limit value of the above inequality, a curvature of field in the main scanning direction of not less than 1.0 mm is generated. Further, a light beam having an intensity of $1/e^2$ hardly can be reduced in diameter to not more than 60 μm and further to not more than 40 μm, hindering the realization of a resolution of not less than 600 D.P.I.

Particularly preferably, a relationship $-0.9 < \Delta\beta/\beta2 - 0.2 \ (D1/D2) < -0.5$ is satisfied. When the value of $\Delta\beta/\beta2 - 0.2 \ (D1/D2)$ is lower than a lower limit value of the above inequality or higher than an upper limit value of the above inequality, a curvature of field in the main scanning direction of not less than 0.5 mm is generated. Further, a light beam having an intensity of $1/e^2$ hardly can be reduced in diameter to not more than 40 μm and further to not more than 25 μm, hindering the realization of a resolution of not less than 1,200 D.P.I.

By referring to FIG. 8, the foregoing description was made using the optical systems described in Embodiment 1 as an example. However, preferably, the optical systems of Embodiments 2 and 3 also satisfy the above-mentioned relationships to provide the same effects as described above.

Embodiment 7

Figure 9:
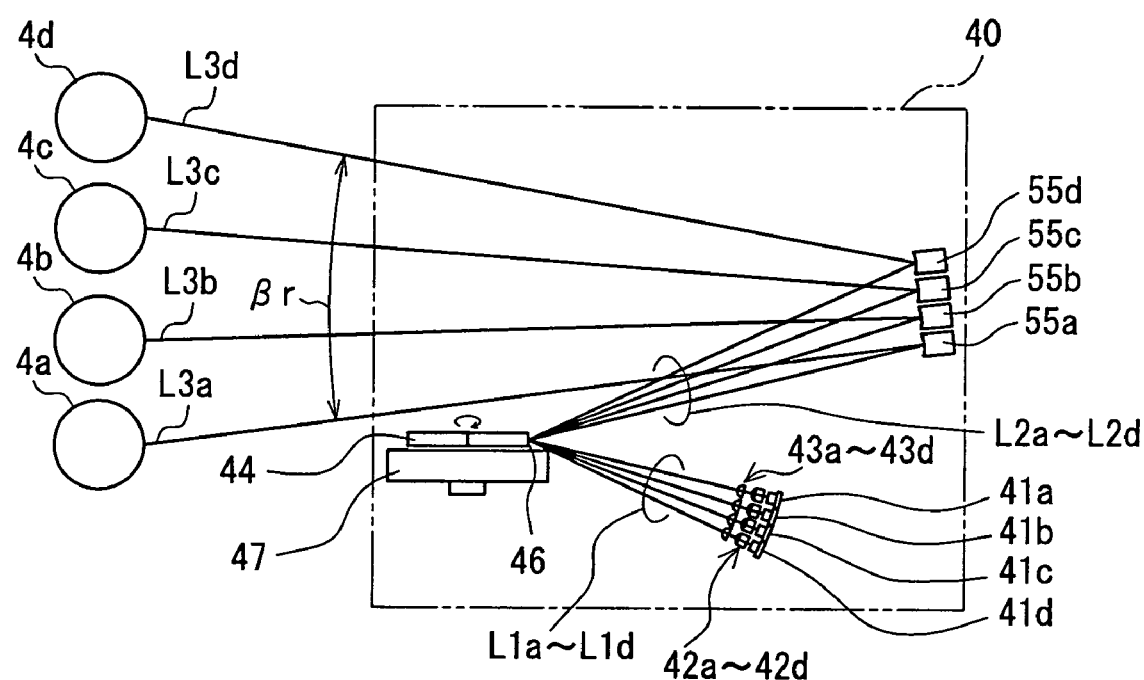
FIG. 9 is a schematic structural view of an optical unit that is an optical scanning device according to Embodiment 7 of the present invention.
Figure 10:
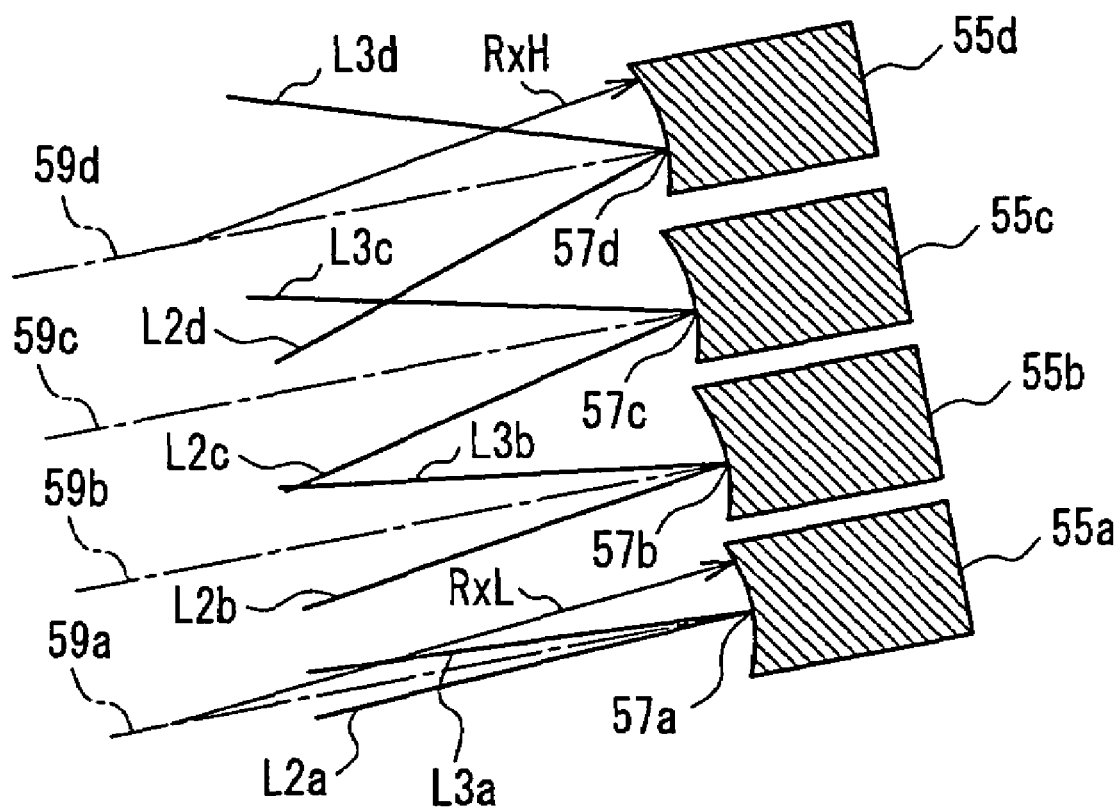
FIG. 10 is a cross-sectional view taken on an XZ plane for showing curved surface mirrors used in the optical scanning device according to Embodiment 7 of the present invention.
Figure 11:
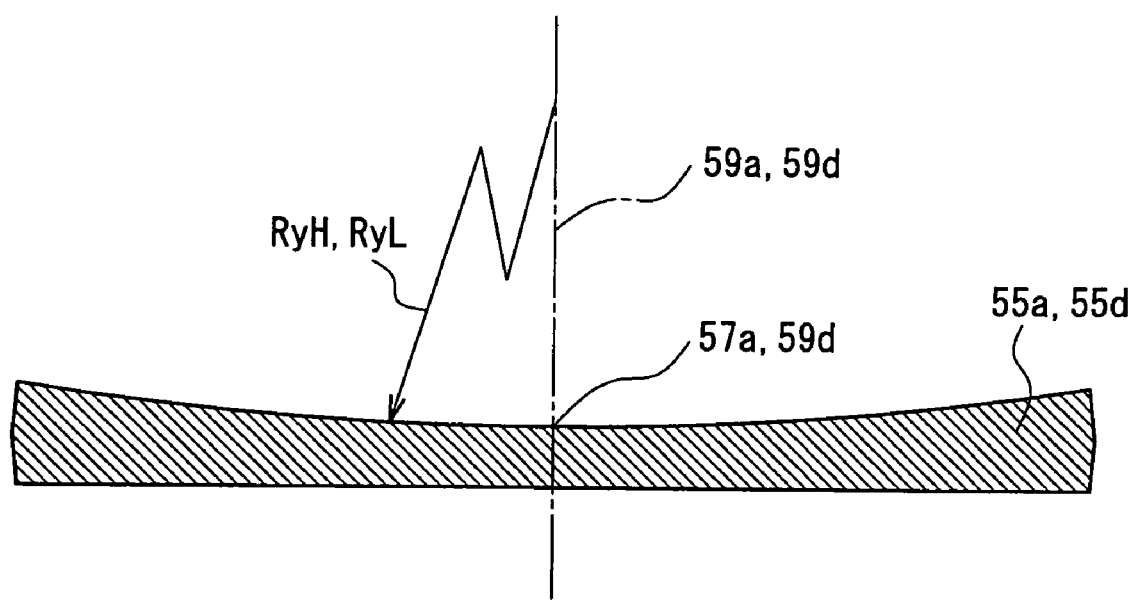
FIG. 11 is a cross-sectional view taken on a YZ plane for showing the curved surface mirrors used in the optical scanning device according to Embodiment 7 of the present invention.

FIG. 9 is a schematic structural view of an optical unit that is an optical scanning device in Embodiment 7 of the present invention as seen from a normal direction to an XZ plane. FIG. 10 is a cross-sectional view taken on the XZ plane for showing curved surface mirrors used in the optical scanning device according to Embodiment 7. FIG. 11 is a cross-sectional view taken on a YZ plane (a plane that is orthogonal to the XZ plane and includes each of normal lines at vertices of the curved surface mirrors) for showing the curved surface mirrors. Like reference characters indicate like constituent elements with respect to Embodiments 1 and 2, for which detailed descriptions are omitted.

In this embodiment, as shown in FIG. 9, in a plane including a rotation axis of a polygon mirror (optical deflector) 44 and vertices of a plurality of curved surface mirrors 55a to 55d (XZ plane), it is assumed that, among a plurality of light beams L3a to L3d that are directed toward a plurality of photosensitive members (surfaces to be scanned) 4a to 4d, the light beam closest to the polygon mirror 44 is a first light beam L3a, the light beam farthest from the polygon mirror 44 is an N-th (in this embodiment, N=4) light beam L3d, and an optical axis of the first light beam L3a forms an angle βr with respect to an optical axis of the N-th light beam L3d. Further, as shown in FIG. 10, a plane that is orthogonal to the XZ plane and includes each of normal lines 59a to 59d at vertices 57a to 57d of the plurality of curved surface mirrors 55a to 55d is assumed to be a YZ plane in each of the curved surface mirrors. Further, it is assumed that, among the plurality of curved surface mirrors 55a to 55d, the curved surface mirror closest to a plane that includes a normal line at a center of a reflecting surface (deflecting surface) 46 and is parallel to a main scanning direction (main scanning plane) is a first curved surface mirror 55a, and at the vertex 57a of the first curved surface mirror 55a, the first curved surface mirror 55a has a radius of curvature RxL in a cross section in the XZ plane (see FIG. 10) and a radius of curvature RyL in a cross section in the YZ plane (see FIG. 11). Further, it is assumed that, among the plurality of curved surface mirrors 55a to 55d, the curved surface mirror farthest from the main scanning plane is an N-th curved surface mirror 55d, and at the vertex of the N-th curved surface mirror 55d, the N-th curved surface mirror 55d has a radius of curvature RxH in a cross section in the XZ plane (see FIG. 10) and a radius of curvature RyH in a cross section in the YZ plane (see FIG. 11). In this case, a relationship $0.001 < [1 - RyH \cdot RxL / RxH \cdot RyL] / \tan\beta r < 0.012$ is satisfied.

When a value of $[1 - RyH \cdot RxL / RxH \cdot RyL] / \tan\beta r$ is lower than a lower limit value of the above inequality or higher than an upper limit value of the above inequality, a curvature of field in the main scanning direction of not less than 2.5 mm is generated. Further, a light beam having an intensity of $1/e^2$ hardly can be reduced in diameter to not more than 80 μm and further to not more than 60 μm, hindering the realization of a resolution of not less than 400 D.P.I.

More preferably, a relationship $0.003 < [1 - RyH \cdot RxL / RxH \cdot RyL] / \tan\beta r < 0.007$ is satisfied. When the value of $[1 - RyH \cdot RxL / RxH \cdot RyL] / \tan\beta r$ is lower than a lower limit value of the above inequality or higher than an upper limit value of the above inequality, a curvature of field in the main scanning direction of not less than 1.0 mm is generated. Further, a light beam having an intensity of $1/e^2$ hardly can be reduced in diameter to not more than 60 μm and further to not more than 40 μm, hindering the realization of a resolution of not less than 600 D.P.I.

By referring to FIGS. 9 to 11, the foregoing description was made using the optical systems described in Embodiment 2 as an example. However, preferably, the optical systems of Embodiments 1 and 3 also satisfy the above-mentioned relationships to provide the same effects as described above.

Embodiment 8

Figure 12:
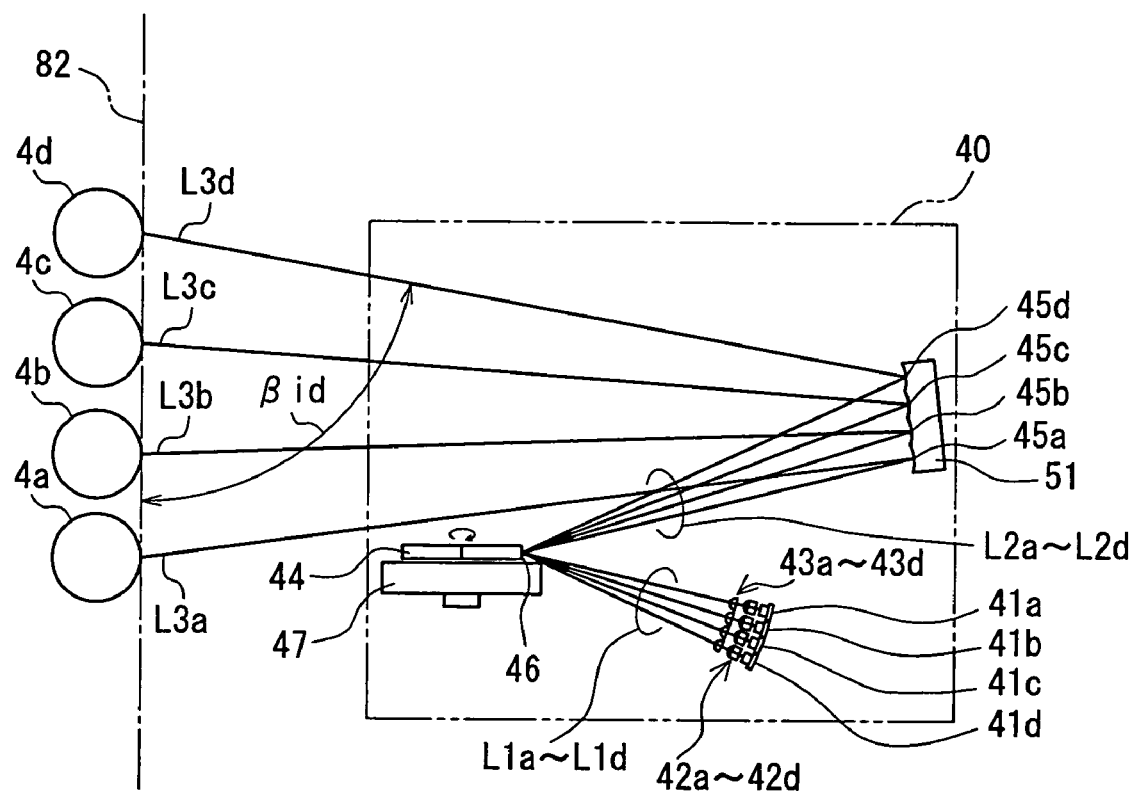
FIG. 12 is a schematic structural view of an optical unit that is an optical scanning device according to Embodiment 8 of the present invention.

FIG. 12 is a schematic structural view of an optical unit that is an optical scanning device in Embodiment 8 of the present invention as seen from a normal direction to an XZ plane. Like reference characters indicate like constituent elements with respect to Embodiment 1, for which detailed descriptions are omitted.

In this embodiment, as shown in FIG. 12, in a plane including a rotation axis of a polygon mirror (optical deflector) 44 and vertices of a plurality of curved surface mirrors 45a to 45d (XZ plane), where among the plurality of curved surface mirrors 45a to 45d, the curved surface mirror closest to a plane that includes a normal line at a center of a reflecting surface (deflecting surface) 46 and is parallel to a main scanning direction (main scanning plane) is a first curved surface mirror 45a, the curved surface mirror farthest from the main scanning plane is an N-th (in this embodiment, N=4) curved surface mirror 45d, and a line 82 linking an intersection of a surface of a first photosensitive member (surface to be scanned) 4a corresponding to the first curved surface mirror 45a and an optical axis of a light beam L3a that is incident on the surface of the first photosensitive member 4a with an intersection of a surface of an N-th photosensitive member (surface to be scanned) 4d corresponding to the N-th curved surface mirror 45d and an optical axis of a light beam L3d that is incident on the surface of the N-th photosensitive member 4d forms an angle βid (degree) with respect to an optical axis of an N-th light beam L3d that is incident on the N-th photosensitive member 4d, a relationship $55 < \beta id \leq 150$ is satisfied.

This configuration can prevent a phenomenon in which a reflection region of the N-th curved surface mirror 45d farthest from the main scanning plane blocks a light beam L3c that is directed from the curved surface mirror 45c adjacent to the N-th curved surface mirror 45*d* toward a photosensitive member 4*c* and a phenomenon in which a reflection region of the first curved surface mirror 45*a* closest to the main scanning plane blocks a light beam L2*b* that is directed toward the curved surface mirror 45*b* adjacent to the first curved surface mirror 45*a*. Thus, excellent optical performance can be secured, and a relative performance error in scanning lines can be reduced, thereby allowing high resolution to be achieved.

By referring to FIG. 12, the foregoing description was made using the optical systems described in Embodiment 1 as an example. However, preferably, the optical systems of Embodiments 2 and 3 also satisfy the above-mentioned relationship to provide the same effects as described above.

Embodiment 9

Figure 13:
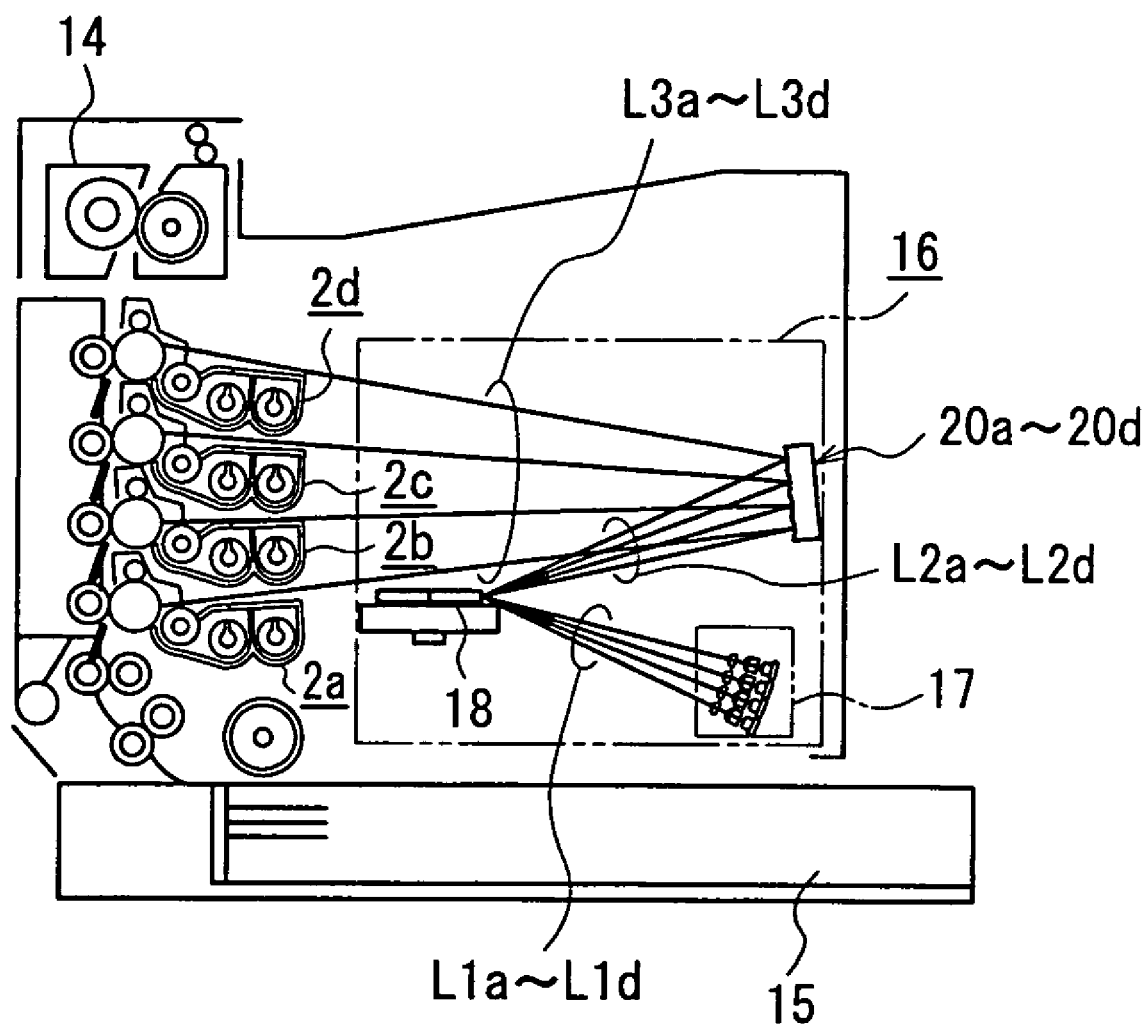
FIG. 13 is a schematic structural view of a color image forming apparatus according to Embodiment 9 of the present invention.

FIG. 13 is a schematic cross-sectional view showing a color image forming apparatus to which any one of the optical scanning devices according to Embodiments 1 to 8 is applied. In FIG. 13, reference characters 2*a* to 2*d* denote image forming units corresponding to four colors (yellow, magenta, cyan, and black), respectively.

Figure 14:
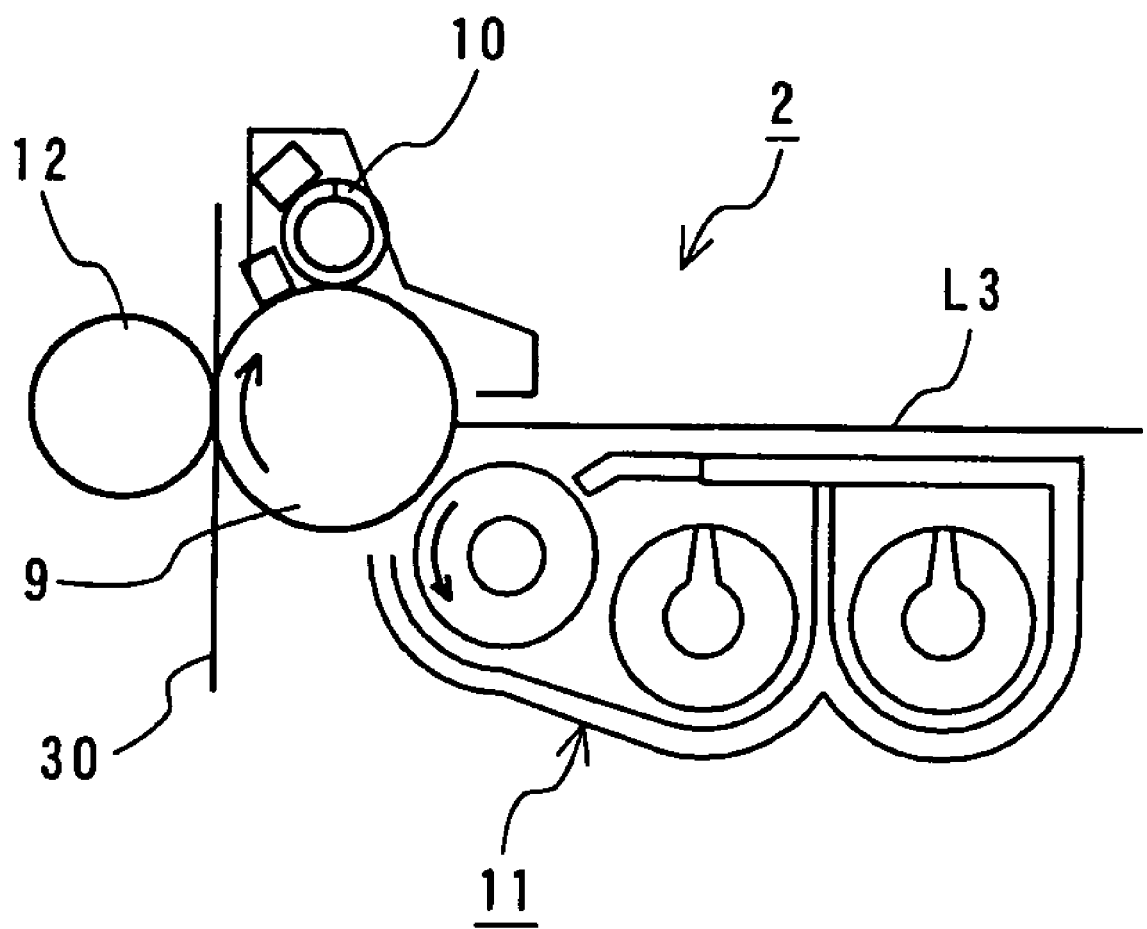
FIG. 14 is a cross-sectional view of an image forming unit that is used in the color image forming apparatus according to Embodiment 9 of the present invention.

FIG. 14 is a cross-sectional view of the image forming units 2*a* to 2*d*. In FIG. 14, since the image forming units have the same configuration, only one of the image forming units is shown with indices omitted. Reference character 9 denotes a photosensitive drum as a surface to be scanned that has a surface covered with a photosensitive member whose charges are changed by irradiation with light, and reference character 10 denotes a charging roll that attaches electrostatic ions to a surface of the photosensitive member so that the photosensitive member is charged. Reference character 11 denotes a developing unit that attaches charged toner to an electrostatic latent image portion formed on the photosensitive drum 9, and reference character 12 denotes a transfer roll that transfers a toner image formed on the photosensitive drum 9 onto a transfer material (paper sheet) 30. The image forming unit 2 is composed of the photosensitive drum 9, the charging roll 10, the developing unit 11, and the transfer roll 12.

In FIG. 13, reference characters 14 and 15 denote a fixer that fixes transferred toner on a paper sheet and a paper-feeding cassette, respectively. Further, reference characters 16, 17 and 18 denote any one of the optical scanning devices described in Embodiments 1 to 8, a light source block that is composed of a semiconductor laser, an axial symmetric lens and a cylindrical lens, and a polygon mirror, respectively, and reference characters 20*a* to 20*d* denote curved surface mirrors. FIG. 13 shows an example in which the curved surface mirrors 20*a* to 20*d* are configured integrally as in Embodiment 1. However, a configuration also can be employed in which the curved surface mirrors 20*a* to 20*d* are separated as in Embodiment 2.

The image forming units 2*a* to 2*d* that correspond respectively to the four colors (yellow, magenta, cyan, and black) are disposed in a longitudinal direction. Electrostatic latent images corresponding to the respective colors are formed on the photosensitive drums 9*a* to 9*d* and developed by the developing units 11*a* to 11*d*, respectively. The developed toner images are transferred sequentially for each color onto a paper sheet that has been conveyed from the paper-feeding cassette 15 by means of the transfer rolls 12*a* to 12*d* and fixed by the fixer 14.

According to this configuration, a small-sized color image forming apparatus can be realized that achieves low cost, high-speed operation and high resolution.

As described above, according to this embodiment, a paper-conveying path is provided in a perpendicular direction, and the image forming units 2*a* to 2*d* are arranged so as to be stacked in the longitudinal direction. Therefore, by setting the size of a housing to be reduced in a vertical direction, and further by placing the paper-feeding cassette 15 on a lower side of the image forming units 2*a* to 2*d* so as to eliminate the disadvantage that setting space increases due to the paper-feeding cassette 15 projecting in a lateral direction, a compact apparatus can be realized easily. That is, with respect to a conventional configuration in which four single-color optical units are disposed so as to be stacked in a longitudinal direction, according to this embodiment, a single optical unit is used, and a position at which each of laser beams for the respective colors forms an image can be adjusted freely. Thus, even in the configuration in which the image forming units 2*a* to 2*d* are arranged in four layers in the longitudinal direction, an increase in size in the vertical direction is avoided.

Furthermore, light beams L3*a* to L3*d* that are directed from the curved surface mirrors 20*a* to 20*d* toward the photosensitive drums 9*a* to 9*d* diffuse in substantially a fan shape in an XZ plane, and thus the spacing between each pair of adjacent ones of the curved surface mirrors 20*a* to 20*d* can be smaller than the spacing between each pair of adjacent ones of the photosensitive drums 9*a* to 9*d*, thereby allowing the accuracy of components to be secured. The respective angles of light beams L1*a* to L1*d*, light beams L2*a* to L2*d*, and the light beams L3*a* to L3*d* can be set freely, and thus any arrangement can be selected so as to be suited for each apparatus. However, preferably, as in this embodiment, the spacing between each pair of adjacent ones of the curved surface mirrors 20*a* to 20*d* is made small, and the curved surface mirrors 20*a* to 20*d* are configured integrally by resin molding or the like.

Furthermore, in the XZ plane, the light beam L3*a* and the light beam L3*d* are set to form an angle of 16°. In this case, even if the photosensitive drums 9*a* to 9*d* have a decentering component of 100 $\mu$m, color shifts due to the decentering component can be suppressed to an amount of not more than 30 $\mu$m.

The smaller the angle the light beam L3*a* and the light beam L3*d* form, the smaller the amount of color shifts. However, the closer the light beam L3*a* and the light beam L3*d* come to a parallel state, the larger the required spacing between each pair of adjacent ones of the curved surface mirrors 20*a* to 20*d* becomes. Because of this, in some cases, the curved surface mirrors 20*a* to 20*d* hardly can be configured integrally, and the optical scanning device 16 is increased in size. In other cases, the spacing between each pair of adjacent ones of the photosensitive drums 9*a* to 9*d* becomes too small, making it difficult to arrange the developing units 11*a* to 11*d*, the charging rolls 10*a* to 10*d* and the like. Therefore, preferably, the light beams L3 have a length 10 or less times greater than the spacing between each pair of adjacent ones of the light beams L3 at the respective positions at which the light beams L3 are incident on the photosensitive drums 9*a* to 9*d*.

Furthermore, the color image forming apparatus according to this embodiment was operated continuously for a long time to find that excellent images were obtained without particularly presenting a problem of, for example, the deterioration in image quality. This was based on the following configurations. That is, a second image forming optical system is composed only of the curved surface mirrors 20*a* to 20*d*, and thus unlike the case of an optical system using a lens, there are no issues of a refractive index changing due to a temperature change. Further, with respect to the fixer 14, the curved surface mirrors 20a to 20d are disposed so as to be farther than the photosensitive drums 9a to 9d and the polygon mirror 18, and thus are far from the fixer 14 that is a heat source, thereby reducing the degree of deformation of the curved surface mirrors 20a to 20d.

Furthermore, according to this configuration, by changing the configuration of an inner portion of the optical scanning device 16 (for example, by changing normal directions of the curved surface mirrors), the spacing between each pair of adjacent ones of laser beams of the respective colors can be adjusted freely, and thus the spacing between each pair of adjacent ones of the image forming units 2a to 2d can be reduced. Further, the spacing between each pair of adjacent ones of curved surface mirrors 20a to 20d can be made smaller than the spacing between each pair of adjacent ones of the photosensitive drums 9a to 9d, and thus high mounting accuracy can be maintained. In the above-described technical configuration, preferably, in view of mounting workability and the like, the image forming units 2a to 2d are formed into cartridges, each containing a corresponding one of the photosensitive drums 9a to 9d and as many peripheral components as possible.

The embodiments disclosed in this application are intended to illustrate the technical aspects of the invention and not to limit the invention thereto. The invention may be embodied in other forms without departing from the spirit and the scope of the invention as indicated by the appended claims and is to be broadly construed.

The invention claimed is:

1. An optical scanning device, comprising:
   a plurality of light sources;
   a single optical deflector that scans light beams emitted respectively from the plurality of light sources;
   a first image forming optical system that is disposed between the optical deflector and the plurality of light sources and allows linear images of the light beams to be formed on a common deflecting surface of the optical deflector; and
   a second image forming optical system that is disposed between the optical deflector and a plurality of surfaces to be scanned corresponding to the plurality of light sources and has a plurality of curved surface mirrors that are in one-to-one correspondence with the plurality of surfaces to be scanned,
   wherein the plurality of light sources, the optical deflector, and the second image forming optical system are disposed at different positions in a sub-scanning direction so that light beams from the first image forming optical system are incident respectively on the deflecting surface obliquely with respect to a plane that includes a normal line at a center of the deflecting surface of the optical deflector and is parallel to a main scanning direction (hereinafter, referred to as a "main scanning plane"), and so that light beams from the optical deflector are incident respectively on the plurality of curved surface mirrors obliquely with respect to a plane that includes each of normal lines at vertices of the plurality of curved surface mirrors and is parallel to the main scanning direction,
   the plurality of curved surface mirrors are disposed on the same side with respect to the main scanning plane, and curved surfaces of the plurality of curved surface mirrors vary in shape.

2. The optical scanning device according to claim 1, wherein the plurality of curved surface mirrors have a width in the sub-scanning direction that increases in a direction from one of the plurality of curved surface mirrors close to the optical deflector toward another of the plurality of curved surface mirrors far from the optical deflector.

3. The optical scanning device according to claim 1, wherein in a plane including a rotation axis of the optical deflector and the vertices of the plurality of curved surface mirrors, no two from among a plurality of light beams that are incident on the optical deflector, a plurality of light beams that are reflected off the optical deflector to be incident on the plurality of curved surface mirrors, and a plurality of light beams that are reflected off the plurality of curved surface mirrors to be directed toward the plurality of surfaces to be scanned are parallel to each other.

4. The optical scanning device according to claim 1, wherein in a plane including a rotation axis of the optical deflector and the vertices of the plurality of curved surface mirrors, a light beam that is incident on the surface to be scanned farthest from the optical deflector among the plurality of surfaces to be scanned forms an angle of not larger than 20 degrees with respect to a light beam that is incident on the surface to be scanned closest to the optical deflector among the plurality of surfaces to be scanned.

5. The optical scanning device according to claim 1, wherein the plurality of curved surface mirrors are configured integrally.

6. The optical scanning device according to claim 1, wherein the plurality of curved surface mirrors vary in position of the vertices in the sub-scanning direction.

7. The optical scanning device according to claim 1, wherein in the sub-scanning direction, the vertices of the plurality of curved surface mirrors are at a distance from a middle portion in the sub-scanning direction of a corresponding one of the plurality of curved surface mirrors, which increases in a direction from one of the plurality of curved surface mirrors close to the optical deflector toward another of the plurality of curved surface mirrors far from the optical deflector.

8. The optical scanning device according to claim 1, wherein the first image forming optical system comprises a single cylindrical lens on which a plurality of the light beams are incident.

9. The optical scanning device according to claim 8, wherein a single aperture further is provided that has a plurality of openings for adjusting shapes of light beams emitted from the plurality of light sources, and the aperture is disposed immediately in front of the cylindrical lens.

10. The optical scanning device according to claim 1, wherein no two from among a plurality of light beams emitted from the plurality of light sources are parallel to each other.

11. The optical scanning device according to claim 1, wherein in a plane including a rotation axis of the optical deflector and the vertices of the plurality of curved surface mirrors, where: among the plurality of curved surface mirrors, the curved surface mirror closest to the main scanning plane is a first curved surface mirror, the curved surface mirror farthest from the main scanning plane is an N-th (N is an integer not smaller than 2) curved surface mirror, and the vertex of the first curved surface mirror is at a distance Lm from the vertex of the N-th curved surface mirror; among the plurality of surfaces to be scanned, the surface to be scanned corresponding to the first curved surface mirror is a first surface to be scanned, the surface to be scanned corresponding to the N-th curved surface mirror is an N-th surface to be scanned, and an intersection of the first surface to be scanned and an optical axis of a light beam that is incident on the first surface to be scanned is at a distance Li from an intersection of the N-th surface to be scanned and an optical axis of a light beam that is incident on the N-th surface to be scanned; the vertex of the N-th curved surface mirror is at a distance D1 from the deflecting surface; and the vertex of the N-th curved surface mirror is at a distance D2 from the intersection of the N-th surface to be scanned and the optical axis of the light beam that is incident on the N-th surface to be scanned, a relationship $0.25 < (Lm/Li)/(D1/D2) < 0.45$ is satisfied.

12. The optical scanning device according to claim 1, wherein in a plane including a rotation axis of the optical deflector and the vertices of the plurality of curved surface mirrors, where: among a plurality of light beams that are directed toward the plurality of surfaces to be scanned, the light beam closest to the optical deflector is a first light beam, the light beam farthest from the optical deflector is an N-th (N is an integer not smaller than 2) light beam, and an optical axis of the first light beam forms an angle $\beta r$ with respect to an optical axis of the N-th light beam; among the plurality of surfaces to be scanned, the surface to be scanned on which the first light beam is incident is a first surface to be scanned, the surface to be scanned on which the N-th light beam is incident is an N-th surface to be scanned, and an intersection of the first surface to be scanned and the optical axis of the first light beam that is incident on the first surface to be scanned is at a distance Li from an intersection of the N-th surface to be scanned and the optical axis of the N-th light beam that is incident on the N-th surface to be scanned; the vertex of an N-th curved surface mirror corresponding to the N-th surface to be scanned is at a distance D1 from the deflecting surface; and the vertex of the N-th curved surface mirror is at a distance D2 from the intersection of the N-th surface to be scanned and the optical axis of the N-th light beam that is incident on the N-th surface to be scanned, a relationship $1.0 < (D1+D2)\cdot\tan\beta r/Li < 1.6$ is satisfied.

13. The optical scanning device according to claim 1, wherein in a plane including a rotation axis of the optical deflector and the vertices of the plurality of curved surface mirrors, where: among the plurality of curved surface mirrors, the curved surface mirror closest to the main scanning plane is a first curved surface mirror, the curved surface mirror farthest from the main scanning plane is an N-th (N is an integer not smaller than 2) curved surface mirror, among the plurality of surfaces to be scanned, the surface to be scanned corresponding to the first curved surface mirror is a first surface to be scanned, the surface to be scanned corresponding to the N-th curved surface mirror is an N-th surface to be scanned, and a line linking the vertex of the first curved surface mirror with the vertex of the N-th curved surface mirror forms an angle AB with respect to a line linking an intersection of the first surface to be scanned and an optical axis of a light beam that is incident on the first surface to be scanned with an intersection of the N-th surface to be scanned and an optical axis of a light beam that is incident on the N-th surface to be scanned; the normal line at the vertex of the N-th curved surface mirror forms an angle $\beta 2$ with respect to an optical axis of an N-th light beam that is incident on the N-th curved surface mirror from the deflecting surface; the vertex of the N-th curved surface mirror is at a distance D1 from the deflecting surface; and the vertex of the N-th curved surface mirror is at a distance D2 from the intersection of the N-th surface to be scanned and the optical axis of the light beam that is incident on the N-th surface to be scanned, a relationship $-1.8 < \Delta\beta/\beta 2 - 0.2 (D1/D2) < 0.4$ is satisfied.

14. The optical scanning device according to claim 1, wherein in a plane including a rotation axis of the optical deflector and the vertices of the plurality of curved surface mirrors (hereinafter, referred to as an "XZ plane"), where: among a plurality of light beams that are directed toward the plurality of surfaces to be scanned, the light beam closest to the optical deflector is a first light beam, the light beam farthest from the optical deflector is an N-th (N is an integer not smaller than 2) light beam, and an optical axis of the first light beam forms an angle $\alpha r$ with respect to an optical axis of the N-th light beam;

a plane that is orthogonal to the XZ plane and includes each of the normal lines at the vertices of the plurality of curved surface mirrors is a YZ plane in each of the plurality of curved surface mirrors;

among the plurality of curved surface mirrors, the curved surface mirror closest to the main scanning plane is a first curved surface mirror, and at the vertex of the first curved surface mirror, the first curved surface mirror has a radius of curvature RxL in a cross section in the XZ plane and a radius of curvature RyL in a cross section in the YZ plane; and among the plurality of curved surface mirrors, the curved surface mirror farthest from the main scanning plane is an N-th curved surface mirror, and at the vertex of the N-th curved surface mirror, the N-th curved surface mirror has a radius of curvature RxH in a cross section in the XZ plane and a radius of curvature RyH in a cross section in the YZ plane, a relationship $0.001 < [1-RyH\cdot RxL/RxH\cdot RyL]/\tan\beta r < 0.012$ is satisfied.

15. The optical scanning device according to claim 1, wherein in a plane including a rotation axis of the optical deflector and the vertices of the plurality of curved surface mirrors, where among the plurality of curved surface mirrors, the curved surface mirror closest to the main scanning plane is a first curved surface mirror, the curved surface mirror farthest from the main scanning plane is an N-th (N is an integer not smaller than 2) curved surface mirror, and a line linking an intersection of a first surface to be scanned corresponding to the first curved surface mirror and an optical axis of a light beam that is incident on the first surface to be scanned with an intersection of an N-th surface to be scanned corresponding to the N-th curved surface mirror and an optical axis of a light beam that is incident on the N-th surface to be scanned forms an angle $\beta id$ (degree) with respect to an optical axis of an N-th light beam that is incident on the N-th surface to be scanned, a relationship $55 < \beta id \leq 150$ is satisfied.

16. A color image forming apparatus, comprising:
an optical scanning device as claimed in claim 1;
a plurality of photosensitive members that are disposed respectively on the plurality of surfaces to be scanned;
a plurality of developers that correspond respectively to the plurality of photosensitive members and develop toner images of different colors respectively on the plurality of photosensitive members;
a transferring unit that transfers the toner images on the plurality of photosensitive members onto a transfer material; and
a fixer that fixes the toner images transferred onto the transfer material.

* * * * *